United States Patent
Huang et al.

(10) Patent No.: US 12,109,551 B2
(45) Date of Patent: Oct. 8, 2024

(54) RARE-EARTH-MANGANESE/CERIUM-ZIRCONIUM-BASED COMPOSITE COMPOUND, METHOD FOR PREPARING SAME AND USE THEREOF

(71) Applicants: GRIREM ADVANCED MATERIALS CO., LTD., Beijing (CN); Rare Earth Functional Materials (Xiong 'an) Innovation Center Co., Ltd., Hebei (CN); GRIREM HI-TECH CO., LTD., Hebei (CN)

(72) Inventors: Xiaowei Huang, Beijing (CN); Yongqi Zhang, Beijing (CN); Hongwei Li, Beijing (CN); Zhizhe Zhai, Beijing (CN); Qiang Zhong, Beijing (CN); He Zhang, Beijing (CN); Meisheng Cui, Beijing (CN); Yongke Hou, Beijing (CN); Hao Wang, Beijing (CN); Zongyu Feng, Beijing (CN)

(73) Assignees: GRIREM ADVANCED MATERIALS CO., LTD., Beijing (CN); Rare Earth Functional Materials (Xiong'an) Innovation Center Co., Ltd., Baoding (CN); GRIREM HI-TECH CO., LTD., Langfang (CN)

( * ) Notice: Subject to any disclaimer, the term of this patent is extended or adjusted under 35 U.S.C. 154(b) by 364 days.

(21) Appl. No.: 17/422,691

(22) PCT Filed: Sep. 4, 2020

(86) PCT No.: PCT/CN2020/113455
§ 371 (c)(1),
(2) Date: Jul. 13, 2021

(87) PCT Pub. No.: WO2021/043256
PCT Pub. Date: Mar. 11, 2021

(65) Prior Publication Data
US 2022/0184583 A1    Jun. 16, 2022

(30) Foreign Application Priority Data
Sep. 4, 2019 (CN) .......................... 201910833257.8
Sep. 4, 2019 (CN) ......................... 201910845391.X

(51) Int. Cl.
*B01J 21/06*    (2006.01)
*B01J 6/00*    (2006.01)
(Continued)

(52) U.S. Cl.
CPC ............... *B01J 23/10* (2013.01); *B01J 6/001* (2013.01); *B01J 21/066* (2013.01); *B01J 23/02* (2013.01);
(Continued)

(58) Field of Classification Search
CPC . B01J 21/066; B01J 23/02; B01J 23/10; B01J 35/19; B01J 35/397; B01J 35/398; B01J 37/04; B01J 6/001; F01N 3/10
(Continued)

(56) References Cited

U.S. PATENT DOCUMENTS 7,767,175 B2    8/2010    Golden et al.
8,048,389 B2 *    11/2011    Okamoto ............. B01D 53/945
423/594.12

(Continued)

FOREIGN PATENT DOCUMENTS

CN    100998941 A    7/2007
CN    104624184 A    5/2015
(Continued)

OTHER PUBLICATIONS

Wang et al., Studies on Properties of Support Combustion Catalysts La0.8 Sr0.2 CoO3/ZrO2—CeO2, Acta Scientiarum Naturalium Universitatis NeiMongol, 2001, 32(3), pp. 270-273, dated May 31, 2001.
(Continued)

*Primary Examiner* — Cam N. Nguyen
(74) *Attorney, Agent, or Firm* — Westbridge IP LLC

(57) ABSTRACT

The present invention discloses a rare-earth-manganese/cerium-zirconium-based composite compound, a method for preparing the same, and a use thereof. The composite compound is of a core-shell structure with a general formula expressed as: $A\,RE_cB_aO_b\text{-}(1\text{-}A)Ce_xZr_{(1-x-y)}M_yO_{2-z}$, wherein $0.1 \leq A \leq 0.3$, preferably $0.1 \leq A \leq 0.2$; a shell layer has a main component of rare-earth manganese oxide with a general formula of $RE_cMn_aO_b$, wherein RE is a rare-earth element or a combination of more than one rare-earth elements, and
(Continued)

B is Mn or a combination of Mn and a transition metal element, $1 \leq a \leq 8$, $2 \leq b \leq 18$, and $0.25 \leq c \leq 4$; and a core has a main component of cerium-zirconium composite oxide with a general formula of $Ce_xZr_{(1-x-y)}M_yO_{2-z}$, wherein M is one or more non-cerium rare-earth elements, $0.1 \leq x \leq 0.9$, $0 \leq y \leq 0.3$, and $0.01 \leq z \leq 0.3$. The composite compound enhances an oxygen storage capacity of a cerium-zirconium material through an interface effect, thereby increasing a conversion rate of a nitrogen oxide.

28 Claims, 4 Drawing Sheets

(51) Int. Cl.
    *B01J 23/02*     (2006.01)
    *B01J 23/10*     (2006.01)
    *B01J 35/00*     (2006.01)
    *B01J 35/30*     (2024.01)
    *B01J 35/39*     (2024.01)
    *B01J 37/04*     (2006.01)
    *F01N 3/10*     (2006.01)

(52) U.S. Cl.
    CPC ............. *B01J 35/19* (2024.01); *B01J 35/397* (2024.01); *B01J 35/398* (2024.01); *B01J 37/04* (2013.01); *F01N 3/10* (2013.01); *F01N 2570/14* (2013.01)

(58) Field of Classification Search
    USPC ................................. 502/302–304, 324, 349
    See application file for complete search history.

(56) References Cited

U.S. PATENT DOCUMENTS

| | | | |
|---|---|---|---|
| 8,580,701 B2 * | 11/2013 | Adib | ........................ B01J 35/23 502/308 |
| 8,959,894 B2 | 2/2015 | Qi et al. | |
| 10,173,200 B2 * | 1/2019 | Huang | ...................... B01J 23/83 |
| 2008/0009410 A1 * | 1/2008 | Okamoto | ................. B01J 23/63 502/304 |
| 2009/0099012 A1 * | 4/2009 | Suzuki | ................. B01J 37/0248 502/303 |
| 2012/0036834 A1 | 2/2012 | Qi et al. | |
| 2012/0047874 A1 | 3/2012 | Schmieg et al. | |

FOREIGN PATENT DOCUMENTS

| | | | | |
|---|---|---|---|---|
| CN | 104998655 | A | 10/2015 | |
| CN | 105289602 | A | 2/2016 | |
| CN | 105983403 | A | 10/2016 | |
| CN | 107570145 | A | 1/2018 | |
| EP | 3257581 | A1 * | 12/2017 | ............ B01D 53/86 |
| JP | 2001522713 | A | 11/2001 | |
| JP | 2017189761 | A | 10/2017 | |
| KR | 100416357 | B1 | 1/2004 | |
| WO | 9924153 | A1 | 5/1999 | |
| WO | 0067904 | A1 | 11/2000 | |
| WO | 2011095656 | A1 | 8/2011 | |

OTHER PUBLICATIONS

Xu et al., Influence of Mn/(Mn+Ce) Ratio of MnOx—CeO2/WO3—ZrO2 Monolith Catalyst on Selective Catalytic Reduction of NOx with Ammonia, Chinese Journal of Catalysis, 2012, 33(12), pp. 1927-1937, dated Dec. 31, 2012.

International Search Report of PCT/CN2020/113455.

Written Opinion of PCT/CN2020/113455.

Wang. Kebing et al., Studies on Properties of Supported Combustion Catalysts La0.8 Sr0.2 CoO3/ZrO2—CeO2 Acta Scientiarum Naturalium Universitatis Neimongol, vol. 32, No. 3, May 31, 2001 (May 31, 2001), ISSN: 1000-1638, abstract and experimental part.

Chen, Maochong et al., Application of Mn-Based Catalysts for the Catalytic Combustion of Diesel Soot, Progress in Chemistry, vol. 31, No. 5, Mar. 21, 2019 (Mar. 21, 2019), ISSN: 1005-281X, p. 731, left-hand column, paragraph 2, right-hand column, paragraphs 2, p. 733, right-hand column, paragraphs 4, p. 734, left-hand, paragraph 2.

* cited by examiner

RARE-EARTH-MANGANESE/CERIUM-ZIRCONIUM-BASED COMPOSITE COMPOUND, METHOD FOR PREPARING SAME AND USE THEREOF

CROSS-REFERENCE TO RELATED APPLICATIONS

This application claims priorities to Chinese Patent Application No. 201910833257.8, entitled "RARE-EARTH-MANGANESE/CERIUM-ZIRCONIUM COMPOSITE COMPOUND OF CORE-SHELL STRUCTURE, METHOD FOR PREPARING SAME AND CATALYST" and filed with the China National Intellectual Property Administration on Sep. 4, 2019, and to Chinese Patent Application No. 201910845391.X, entitled "RARE-EARTH-MANGANESE-SUPPORTED CERIUM-ZIRCONIUM COMPOSITE COMPOUND, METHOD FOR PREPARING SAME AND CATALYST" and filed with the China National Intellectual Property Administration on Sep. 4, 2019, the disclosures of which are here incorporated by reference in their entireties.

TECHNICAL FIELD

Embodiments of the present invention relate to the field of oxygen-storage material technologies, and in particular, relate to a rare-earth-manganese/cerium-zirconium-based composite compound, a method for preparing the same, and a catalyst including the composite compound.

BACKGROUND

With the increasing shortage of petroleum resources and the intensification of global warming trends, lean-burn engines (diesel engines and lean-burn gasoline engines) have attracted widespread attention due to their higher fuel economy and lower greenhouse gas emission. However, there are a large amount of nitrogen oxides ($NO_x$) in exhaust gases of the lean-burn engines, which may not only cause prominent environmental problems such as photochemical smog and acid rain, but also bring serious harm to the health of human beings. Therefore, how to effectively remove $NO_x$ in the exhaust gas of the lean-burn engines has become a research hotspot of catalysis in the environment today. At the present stage, the after-treatment of the exhaust gas of diesel engines mainly involves DOC, SCR, DPF, SCRF/CDPF, and ASC. DOC refers to a diesel oxidation catalyst for reducing gas pollutants such as nitrogen oxides ($NO_x$), hydrocarbons (HC) and carbon monoxide (CO) for the diesel engines. In the exhaust gas of existing diesel vehicles, $NO_2$ accounts for a small proportion of the total $NO_x$. To increase the proportion of $NO_2$, a catalyst capable of efficiently oxidizing NO and a catalyst promoter with a high oxygen storage capacity are required. At present, an oxygen storage material commonly used in DOC has an oxygen storage capacity that is typically less than 600 umol-$O_2$/g. However, to achieve higher NO oxidation performance, there is a need of a material with a higher oxygen storage capacity and a low-temperature conversion capability.

SUMMARY

According to an aspect of the present invention, a rare-earth-manganese/cerium-zirconium-based composite compound is provided.

The composite compound is of a core-shell structure, with a general formula expressed as: $ARE_cB_aO_b\text{-}(1\text{-}A)\ Ce_xZr_{(1-x-y)}M_yO_{2-z}$, wherein $0.1 \leq A \leq 0.3$, and preferably, $0.1 \leq A \leq 0.2$;

a shell layer has a main component of rare-earth manganese oxide with a general formula of $RE_cB_aO_b$, wherein RE is a rare-earth element or a combination of more than one rare-earth elements, B is Mn or a combination of Mn and a transition metal element, $1 \leq a \leq 8$, $2 \leq b \leq 18$, and $0.25 \leq c \leq 4$; and a core has a main component of cerium-zirconium composite oxide with a general formula of $Ce_xZr_{(1-x-y)}M_yO_{2-z}$, wherein M is at least one selected from a group consisting of a non-cerium rare-earth element and a transition metal element, $0.1 \leq x \leq 0.9$, $0 \leq y \leq 0.3$, and $0.01 \leq z \leq 0.3$.

In an optional embodiment, a mass of the Mn element in the shell layer is 70-98 wt %, preferably 90-98 wt %, of a total mass of the Mn element in the composite compound.

Specifically, cerium in the cerium-zirconium composite oxide has a composite valence state of trivalence and tetravalence, and tetravalent cerium accounts for 60-90 wt %, more preferably 70-80 wt %, of the total amount of cerium.

In an optional embodiment, $1 \leq a \leq 3$, $2 \leq b \leq 8$, and preferably, the shell layer is of a mullite-type structure. Accordingly, a mass of the Mn element in the shell layer is preferably 70-95 wt %, more preferably 80-90 wt %, of a total mass of the Mn element in the composite compound.

Specifically, the rare-earth element RE in the rare-earth manganese oxide includes one or more selected from a group consisting of lanthanum, cerium, praseodymium, neodymium, samarium, europium and yttrium.

Specifically, M in the cerium-zirconium composite oxide is one or more selected from a group consisting of lanthanum, praseodymium, neodymium, yttrium, samarium, europium, gadolinium, holmium, erbium, thulium, ytterbium, hafnium, aluminum and barium, preferably one or more selected from a group consisting of lanthanum, praseodymium, neodymium, yttrium and samarium.

Specifically, the rare-earth manganese oxide is doped with a transition metal element which is one or more selected from a group consisting of iron, tungsten, molybdenum, nickel, cobalt, vanadium and titanium, preferably one or more selected from a group consisting of iron, nickel, vanadium and titanium.

A mass of the transition metal element is 0.01%-10%, preferably 0.1%-3%, of a mass of the rare-earth manganese oxide, wherein the mass of the transition metal element is based on the self-mass of the transition metal element, and the mass of the rare-earth manganese oxide is based on the mass of the rare-earth manganese oxide before the transition metal element is doped.

Specifically, the rare-earth-manganese/cerium-zirconium-based composite compound has an oxygen storage capacity of not less than 800 umol-$O_2$/g.

Specifically, the rare-earth-manganese/cerium-zirconium-based composite compound has a particle size D50 of 1-15 μm, preferably 2-10 μm, more preferably 3-10 μm.

Further, the shell layer further contains one or more selected from a group consisting of a hydroxide, a carbonate and a basic carbonate, with a content of 0.01-1 wt %.

According to a second aspect of the present invention, a method for preparing the rare-earth-manganese/cerium-zirconium-based composite compound according to any one described above is provided. The method includes:

reacting a mixed raw material containing a divalent manganese source, a rare-earth source, and a cerium-zirconium composite oxide to obtain the rare-earth-manganese/cerium-zirconium-based composite compound.

In an optional embodiment, said reacting the mixed raw material containing the divalent manganese source, the rare-earth source and the cerium-zirconium composite oxide specifically includes the following steps:

preparing the divalent manganese source, the rare-earth source and the cerium-zirconium composite oxide according to a stoichiometric ratio of a final product; and adding a mixed solution containing the divalent manganese source and the rare-earth source to the cerium-zirconium composite oxide for reaction, and after the reaction is completed, drying, calcining and pulverizing a resultant to obtain the rare-earth-manganese/cerium-zirconium-based composite compound.

Specifically, the divalent manganese source in the mixed solution has a concentration of 2-4 mol/L, wherein a molar weight of the divalent manganese source is based on a molar weight of the manganese element; and the rare-earth source in the mixed solution has a concentration of 0.5-2 mol/L, wherein a molar weight of the rare-earth source is based on a molar weight of the rare-earth element.

Specifically, the mixed solution containing the divalent manganese source and the rare-earth source has a volume accounting for 70-150%, preferably 90-120%, of a pore volume of the cerium zirconium composite oxide.

Specifically, the reaction occurs under the following specific conditions:
the reaction occurs under stirring;
a reaction temperature is 15-75° C.; and
reaction duration is 5-20 min.

In another optional embodiment, said reacting the mixed raw material containing the manganese source, the rare-earth source and the cerium-zirconium composite oxide specifically includes the following steps:

preparing the divalent manganese source, the rare-earth source and the cerium-zirconium composite oxide according to a stoichiometric ratio of a final product; and adding a precipitant and an oxidant sequentially to a mixed slurry containing the divalent manganese source, the rare-earth source and the cerium-zirconium composite oxide for reaction, and after the reaction is completed, washing, drying, calcining and pulverizing a resultant to obtain the rare-earth-manganese/cerium-zirconium-based composite compound.

Specifically, the precipitant is at least one selected from a group consisting of sodium hydroxide, ammonia water, ammonium bicarbonate or potassium hydroxide, preferably sodium hydroxide.

Specifically, the precipitant has an amount of substance accounting for 5-90% of a stoichiometric amount required to precipitate a manganese element and a rare-earth element in the slurry.

Specifically, the precipitant is added to the mixed slurry in a form of a precipitant solution; and the precipitant in the precipitant solution has a concentration of 0.5-5 mol/L, preferably 1.0-3.0 mol/L.

Specifically, the oxidant is at least one selected from a group consisting of hydrogen peroxide, oxygen, sodium persulfate, potassium persulfate or ammonium persulfate, preferably hydrogen peroxide.

Specifically, the oxidant has an amount of substance being 0.05-1 time, preferably 0.1-0.5 time, an amount of substance of $Mn^{2+}$ contained in the slurry.

Specifically, the washing occurs under the following specific conditions:
the washing is performed by using deionized water, with a washing end-point at which a conductivity of the deionized water is less than 40 us/cm, preferably less than 20 us/cm.

Specifically, the mixed slurry containing the divalent manganese source, the rare-earth source and the cerium-zirconium composite oxide is prepared by a method including the following steps:

adding the cerium-zirconium composite oxide to water to obtain a cerium-zirconium composite oxide slurry; and mixing the mixed solution containing the divalent manganese source and the rare-earth source with the cerium-zirconium composite oxide slurry to obtain the mixed slurry.

Specifically, the cerium-zirconium composite oxide in the cerium-zirconium composite oxide slurry has a mass concentration of 10-50%.

Specifically, the divalent manganese source in the mixed solution has a concentration of 0.5-2.5 mol/L, wherein a molar weight of the divalent manganese source is based on a molar weight of the manganese element; and the rare-earth source in the mixed solution has a concentration of 0.5-1.5 mol/L, wherein a molar weight of the rare-earth source is based on a molar weight of the rare-earth element.

Specifically, the divalent manganese source is a soluble metal salt of the manganese, and the soluble metal salt of the manganese is at least one selected from a group consisting of a manganese nitrate, a manganese acetate, a manganese chloride and a manganese sulfate; and the rare-earth source is a soluble metal salt of the rare earth, and the soluble metal salt of the rare earth is at least one selected from a group consisting of a rare-earth nitrate, a rare-earth acetate, a rare-earth chloride and a rare-earth sulfate.

Specifically, the calcining occurs under the following specific conditions:
a calcining temperature is 500-900° C.; and
calcining duration is 1-6 h.
Preferably, a calcining temperature is 700-850° C.; and
calcining duration is 3-5 h.

A catalyst includes at least one of the rare-earth-manganese/cerium-zirconium-based composite compound according to any one described above, and the rare-earth-manganese/cerium-zirconium-based composite compound prepared by the method according to any one described above.

According to a fourth aspect of the present invention, a use of at least one of the rare-earth-manganese/cerium-zirconium-based composite compound according to any one described above, and the rare-earth-manganese/cerium-zirconium-based composite compound prepared by the method according to any one described above, as a catalyst in catalytic oxidation of NO in exhaust gases of motor vehicles.

The present invention can achieve the following beneficial effects.

(1) In the rare-earth-manganese/cerium-zirconium-based composite compound prepared by the method according to the present invention, the rare-earth manganese oxide exists on the surface of the cerium-zirconium-based oxide in a form of monolayer dispersion to form a $RE_cB_aO_b$ compound of a core-shell structure. The rare-earth manganese oxide can strongly interact with the cerium-zirconium-based oxide, whereby the physical and chemical properties of the two can be changed.

(2) The monolayer dispersion state allows the surface to have more active sites, and the monolayer dispersion can enhance an interface effect, through which oxygen transmission channels and oxygen vacancies can be constructed between the rare-earth manganese oxide and the cerium-zirconium-based oxide, so that gas-phase oxygen molecules are adsorbed onto the oxygen vacancies to replenish the oxygen to be adsorbed on the surface, thereby greatly enhancing the oxygen storage capacity of the cerium-zirconium material.

(3) The rare-earth-manganese/cerium-zirconium-based composite compound of the core-shell structure is prepared by a co-precipitation method, which can form, on the cerium-zirconium surface, the $RE_cB_aO_b$ compound that is of the core-shell structure containing a mullite structure; the oxygen transmission channels and oxygen vacancies can be constructed between the mullite-structured oxide and the cerium-zirconium composite oxide through the interface effect, so that the gas-phase oxygen molecules are adsorbed onto the oxygen vacancies to replenish the oxygen to be adsorbed on the surface, thereby greatly enhancing the oxygen storage capacity of the cerium-zirconium material and further improving the low-temperature conversion rate of NO.

DETAILED DESCRIPTION

Figure 1:
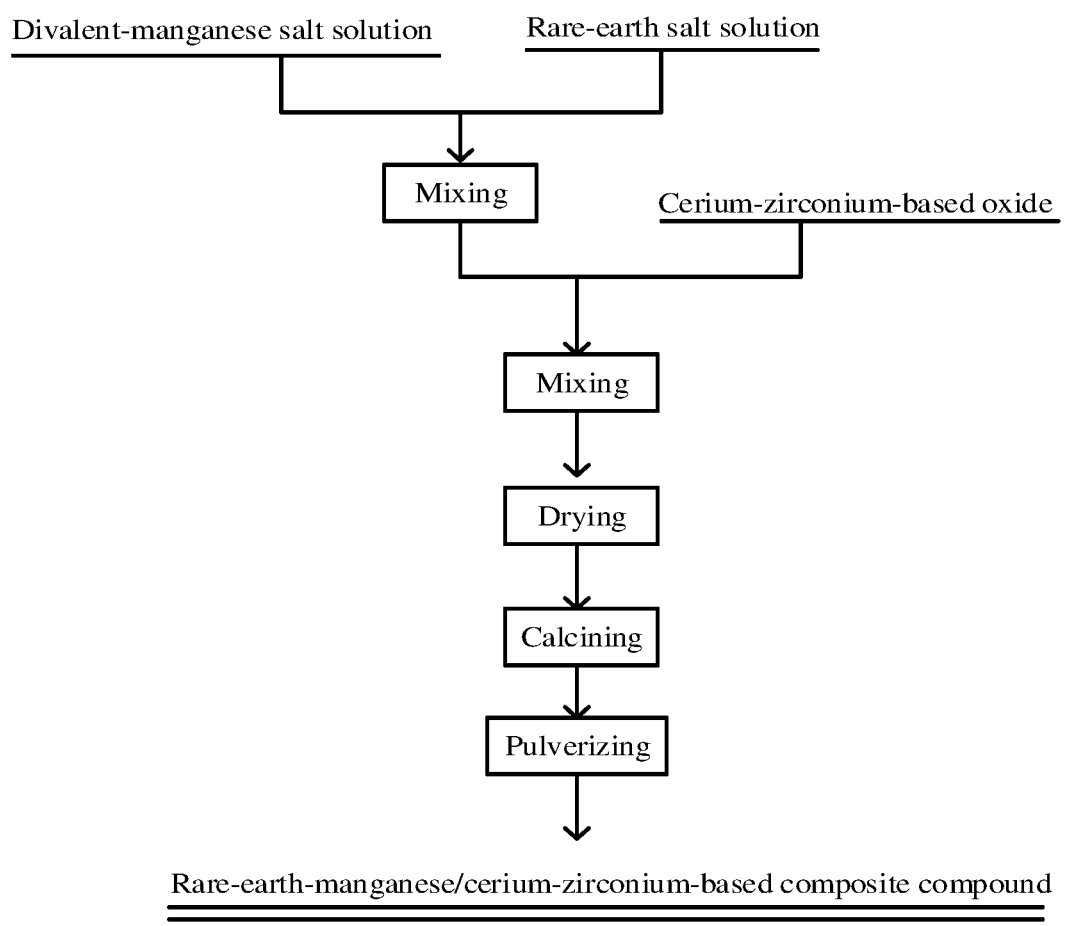
FIG. 1 is a flowchart of a method for preparing a rare-earth-manganese/cerium-zirconium-based composite compound according to a specific embodiment of the present invention.

For clearer descriptions of the objectives, technical solutions, and advantages of the present invention, the present invention is further described in detail hereinafter in combination with specific embodiments and with reference to the accompanying drawings. It should be understood that these descriptions are merely illustrative and are not intended to limit the scope of the present invention. In addition, the descriptions of well-known structures and techniques are omitted in explanation below, in order to avoid unnecessarily obscuring the concept of the present invention.

According to an aspect of the present invention, a rare-earth-manganese/cerium-zirconium-based composite compound is provided.

The composite compound is of a core-shell structure, with a general formula expressed as: A $RE_cB_aO_b$-(1-A) $Ce_xZr_{(1-x-y)}M_yO_{2-z}$, wherein $0.1 \leq A \leq 0.3$. Since the most active site is generally around a dispersion threshold, it is preferred that $0.1 \leq A \leq 0.2$ in order to ensure that the content of the rare-earth manganese oxide in an outer layer is around a monolayer dispersion threshold of the rare-earth and manganese on the surface of the cerium-zirconium-based oxide.

A shell layer has a main component of rare-earth manganese oxide with a general formula of $RE_cB_aO_b$, wherein RE is a rare-earth element or a combination of more than one rare-earth elements, B is Mn or a combination of Mn and a transition metal element, $1 \leq a \leq 8$, $2 \leq b \leq 18$, and $0.25 \leq c \leq 4$; and the rare-earth manganese oxide containing the rear-earth element may form a material having a special phase structure, which shows higher oxidation property to NO.

A core has a main component of cerium-zirconium composite oxide with a general formula of $Ce_xZr_{(1-x-y)}M_yO_{2-z}$, wherein M is at least one selected from a group consisting of a non-cerium rare-earth element and a transition metal element, $0.1 \leq x \leq 0.9$, $0 \leq y \leq 0.3$, and $0.01 \leq z \leq 0.3$. Preferably, x has a range of 0.2-0.7. The cerium-zirconium-based oxide has excellent oxygen storage and release capacities and a precious-metal dispersion performance.

In an optional embodiment, the rare-earth manganese oxide is of a mullite structure.

Generally, the mullite structure is $AB_2O_5$, wherein A indicates a rare-earth element, B indicates a transition metal element, and the rare-earth element may be one or more selected from a group consisting of lanthanum, cerium, praseodymium, neodymium, samarium, europium and yttrium, and the selected transition metal element is an Mn element. The mullite-structured material containing the rare-earth element has higher oxidation performance to NO.

The higher the content of Mn in the shell layer is, the more the active sites are, and the stronger the catalytic activity is. Therefore, a mass of the Mn element in the shell layer is preferably 70-98 wt %, more preferably 90-98 wt %, of a total mass of the Mn element in the composite compound; and in the composite compound, the balance is filtrated cerium or zirconium compound.

Specifically, tetravalent cerium in cerium-zirconium may play a role in stabilizing a phase structure, and the occurrence of part of trivalent cerium may create lattice defects to increase the concentration of oxygen vacancies. The mutual conversion between the trivalent cerium and the tetravalent cerium may quickly release/absorb active oxygen atoms, thereby improving the oxygen storage and release capacities. In the present invention, the tetravalent cerium accounts for 60-90 wt %, preferably 70-80 wt %, of the total amount of cerium. The cerium-zirconium composite oxide material is a solid solution of $CeO_2$ and $ZrO_2$, and has excellent oxygen storage and release capacities and a precious-metal dispersion performance.

In an optional embodiment, $1 \leq a \leq 3$, and $2 \leq b \leq 8$. Accordingly, the Mn element in the shell layer has a mass percentage of preferably 70-95 wt %, more preferably 80-90 wt %.

Specifically, the rare-earth element RE in the rare-earth manganese oxide includes one or more selected from a group consisting of lanthanum, cerium, praseodymium, neodymium, samarium, europium and yttrium.

Specifically, M in the cerium-zirconium composite oxide is one or more selected from a group consisting of lanthanum, praseodymium, neodymium, yttrium, samarium, europium, gadolinium, holmium, erbium, thulium, ytterbium, hafnium, aluminum and barium, preferably one or more selected from a group consisting of lanthanum, praseodymium, neodymium, yttrium and samarium. A certain content of the doped rare-earth element may enhance the high-temperature sintering resistance of the cerium-zirconium composite oxide, and increase the oxygen storage capacity of the cerium-zirconium composite oxide. Moreover, the mass percentage of the doped rare-earth element does not exceed 30% in the cerium-zirconium composite oxide.

Specifically, the rare-earth manganese oxide is doped with a transition metal element which is one or more selected from a group consisting of iron, tungsten, molybdenum, nickel, cobalt, vanadium and titanium, preferably one or more selected from a group consisting of iron, nickel, vanadium and titanium; and a mass of the transition metal element is 0.01%-10%, preferably 0.1%-3%, of a mass of the rare-earth manganese oxide, wherein the mass of the transition metal element is based on the self-mass of the transition metal element, and the mass of the rare-earth manganese oxide is based on the mass of the rare-earth manganese oxide before the transition metal element is doped.

Specifically, the oxygen storage capacity of the cerium-zirconium composite oxide is generally lower than 600 umol-$O_2$/g, and the occurrence of the rare-earth manganese oxide in the outer shell layer increases the concentration of surface oxygen vacancies, so that the oxygen storage capacity is increased, wherein the oxygen storage capacity of the rare-earth-manganese/cerium-zirconium-based composite compound is not less than 800 umol-$O_2$/g.

Specifically, the rare-earth-manganese/cerium-zirconium-based composite compound has a particle size D50 of 1-15 μm, preferably 2-10 μm, more preferably 3-10 μm.

Further, the shell layer further contains one or more selected from a group consisting of a hydroxide, a carbonate and a basic carbonate, with a content of 0.01-1 wt %; and thus, a pore structure can be adjusted to some extent.

According to a second aspect of the present invention, a method for preparing the rare-earth-manganese/cerium-zirconium-based composite compound according to any one described above is provided. The method includes the following step.

A mixed raw material containing a divalent manganese source, a rare-earth source, and a cerium-zirconium composite oxide undergoes a reaction to obtain the rare-earth-manganese/cerium-zirconium-based composite compound.

In an optional embodiment, said reacting the mixed raw material containing the divalent manganese source, the rare-earth source and the cerium-zirconium composite oxide specifically includes the following steps:

preparing the divalent manganese source, the rare-earth source and the cerium-zirconium composite oxide according to a stoichiometric ratio of a final product; and adding a mixed solution containing the divalent manganese source and the rare-earth source to the cerium-zirconium composite oxide for reaction, and after the reaction is completed, drying, calcining and pulverizing a resultant to obtain the rare-earth-manganese/cerium-zirconium-based composite compound.

Specifically, the divalent manganese source in the mixed solution has a concentration of 2-4 mol/L, wherein a molar weight of the divalent manganese source is based on a molar weight of the manganese element; and the rare-earth source in the mixed solution has a concentration of 0.5-2 mol/L, wherein a molar weight of the rare-earth source is based on a molar weight of the rare-earth element.

Specifically, the mixed solution containing the divalent manganese source and the rare-earth source has a volume accounting for 70-150%, preferably 90-120%, of a pore volume of the cerium zirconium composite oxide.

Specifically, the reaction occurs under the following specific conditions:
the reaction occurs under stirring;
a reaction temperature is 15-45° C.; and
reaction duration is 5-20 min.

As shown in FIG. 1, in a specific embodiment, the method for preparing the rare-earth-manganese/cerium-zirconium-based composite compound includes the following steps.

A stoichiometric mixed solution of the divalent manganese salt solution and one or more rare-earth metal salt solutions, as required by a final product, is prepared with a concentration of 4-6 mol/L, preferably 4.5-5.5 mol/L, and specifically, a soluble nitrate, an acetate, a chloride and/or sulfate, preferably the manganese nitrate, are selected as sources of the rare-earth metal salt and the divalent manganese salt.

The cerium-zirconium-based oxide and the prepared rare-earth-manganese mixed solution are mixed to obtain a wet cerium-zirconium composite compound containing rare-earth manganese, and the rare-earth-manganese mixed solution has a volume accounting for 70-150%, preferably 90-120%, of a pore volume of the cerium-zirconium-based oxide.

The wet cerium-zirconium composite compound containing rare-earth manganese is dried, wherein a drying process may be carried out in an oxidizing atmosphere, so as to facilitate the oxidation of low-valent manganese to high-valent manganese for forming the rare-earth manganese oxide with Mn (III, IV, VII) in an oxidation state, and the drying temperature is 80-250° C., preferably 150-220° C.

The dried cerium-zirconium composite compound containing rare-earth manganese is calcined, wherein a calcining condition is as follows: keeping a temperature in a range of 500-900° C. for 1-6 h, preferably in a range of 700-850° C. for 3-5 h.

The calcined composite compound is pulverized to obtain the rare-earth manganese/cerium-zirconium-based composite compound, and the rare-earth-manganese-supported cerium-zirconium composite compound obtained after the pulverization has a particle size D50 of 1-15 μm, preferably 2-10 μm, wherein the selected range of the particle size facilitates easy application during the preparation of a catalyst.

The rare-earth-manganese-supported cerium-zirconium composite compound prepared by the above method may form a core-shell-structured REMn$_a$O$_b$ oxide with the cerium-zirconium-based oxide, so that the oxygen storage capacity of the cerium-zirconium material is improved through the interface effect, thereby improving the oxidation rate of NO. In the above process for preparing the rare-earth manganese oxide according to the embodiments of the present invention, no waste water is generated, and thus, the preparation process is green and environmentally-friendly.

In another optional embodiment, said reacting the mixed raw material containing the manganese source, the rare-earth source and the cerium-zirconium composite oxide specifically includes the following steps:

preparing the divalent manganese source, the rare-earth source and the cerium-zirconium composite oxide according to a stoichiometric ratio of a final product; and adding a precipitant and an oxidant sequentially to a mixed slurry containing the divalent manganese source, the rare-earth source and the cerium-zirconium composite oxide for reaction, and after the reaction is completed, washing, drying, calcining and pulverizing a resultant to obtain the rare-earth-manganese/cerium-zirconium-based composite compound.

Specifically, the precipitant is at least one selected from a group consisting of sodium hydroxide, ammonia water, ammonium bicarbonate or potassium hydroxide, preferably sodium hydroxide.

Specifically, the precipitant has an amount of substance accounting for 5-90% of a stoichiometric amount required to precipitate a manganese element and a rare-earth element in the slurry.

Specifically, the precipitant is added to the mixed slurry in a form of a precipitant solution; and
the precipitant in the precipitant solution has a concentration of 0.5-5 mol/L, preferably 1.0-3.0 mol/L.

Specifically, the oxidant is at least one selected from a group consisting of hydrogen peroxide, oxygen, sodium persulfate, potassium persulfate or ammonium persulfate, preferably hydrogen peroxide.

Specifically, the oxidant has an amount of substance being 0.05-1 time, preferably 0.1-0.5 time, an amount of substance of $Mn^{2+}$ contained in the slurry.

Specifically, the washing occurs under the following specific conditions:
the washing is performed by using deionized water, with a washing end-point at which a conductivity of the deionized water is less than 40 us/cm, preferably less than 20 us/cm.

Specifically, the mixed slurry containing the divalent manganese source, the rare-earth source and the cerium-zirconium composite oxide is prepared by a method including the following steps:
adding the cerium-zirconium composite oxide to water to obtain a cerium-zirconium composite oxide slurry; and
mixing the mixed solution containing the divalent manganese source and the rare-earth source with the cerium-zirconium composite oxide slurry to obtain the mixed slurry.

Specifically, the cerium-zirconium composite oxide in the cerium-zirconium composite oxide slurry has a mass concentration of 10-50%.

Specifically, the divalent manganese source in the mixed solution has a concentration of 0.5-2.5 mol/L, wherein a molar weight of the divalent manganese source is based on a molar weight of the manganese element; and
the rare-earth source in the mixed solution has a concentration of 0.5-1.5 mol/L, wherein a molar weight of the rare-earth source is based on a molar weight of the rare-earth element.

Specifically, the divalent manganese source is a soluble metal salt of the manganese, and the soluble metal salt of the manganese is at least one selected from a group consisting of a manganese nitrate, a manganese acetate, a manganese chloride and a manganese sulfate; and
the rare-earth source is a soluble metal salt of the rare earth, and the soluble metal salt of the rare earth is at least one selected from a group consisting of a rare-earth nitrate, a rare-earth acetate, a rare-earth chloride and a rare-earth sulfate.

Specifically, the calcining occurs under the following specific conditions:
a calcining temperature is 500-900° C.; and
calcining duration is 1-6 h.
Preferably, a calcining temperature is 700-850° C.; and calcining duration is 3-5 h.

Figure 2:
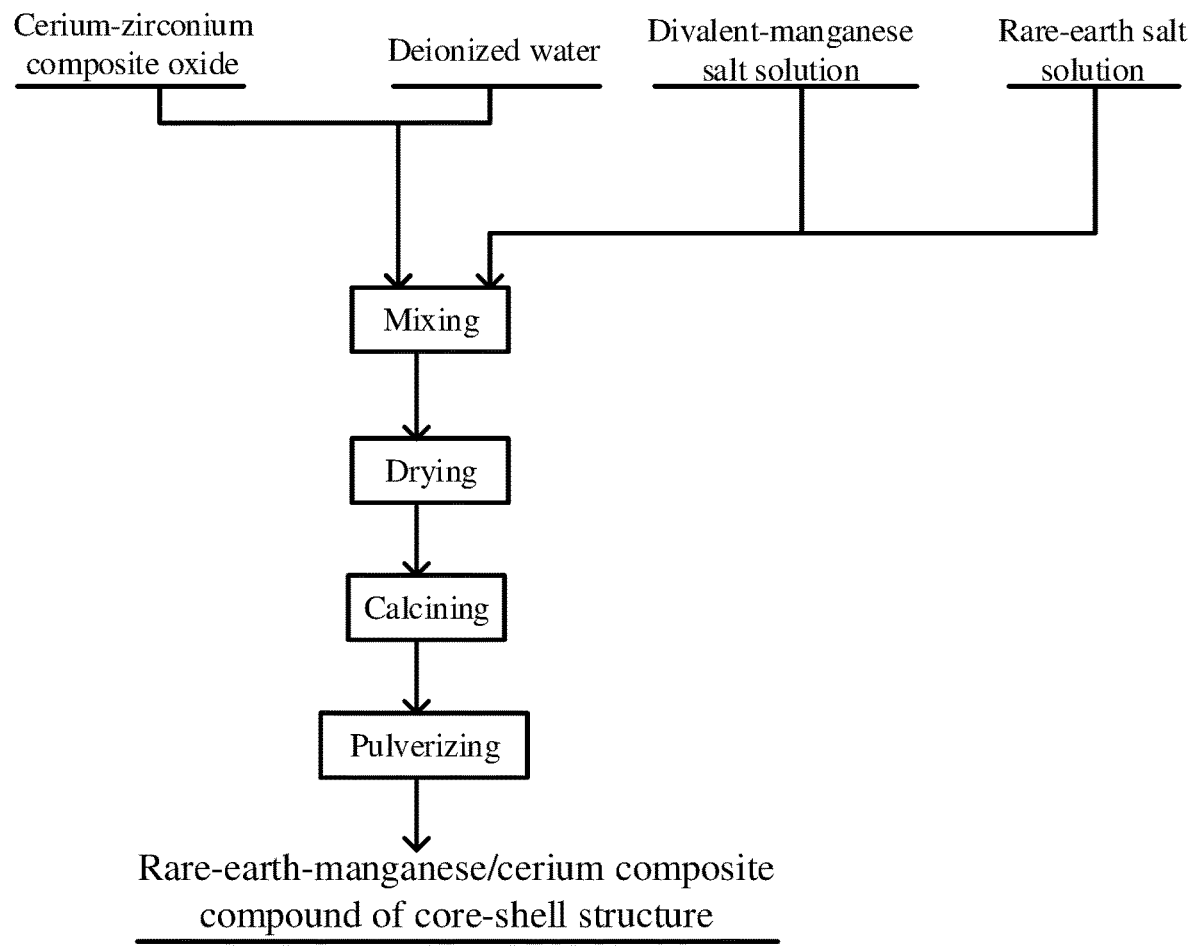
FIG. 2 is a flowchart of a method for preparing a rare-earth-manganese/cerium-zirconium-based composite compound according to another specific embodiment of the present invention.

As shown in FIG. 2, in another specific embodiment, the method for preparing the rare-earth-manganese/cerium-zirconium-based composite compound includes the following steps.

A stoichiometric mixed solution of the divalent manganese salt solution and one or more rare-earth metal salt solutions, as required by a final product, is prepared with a concentration of 2-6 mol/L, and specifically, a soluble nitrate, an acetate, a chloride and/or a sulfate, preferably the nitrate, are selected as sources of the rare-earth metal salt and the divalent manganese salt.

The mixed solution of the manganese salt solution and one or more rare-earth metal salt solutions is added to the cerium-zirconium composite oxide to obtain a cerium-zirconium composite oxide slurry containing the mixed solution of manganese and rare earth salts, and the slurry has a concentration of 5-40%, preferably 10-30%.

After optional drying, calcining and pulverizing, the rare-earth-manganese/cerium-zirconium-based composite compound is obtained. A calcining condition is as follows: keeping a temperature in the range of 500-900° C. for 1-6 h, preferably in the range of 700–850° C. for 3-5 h.

Figure 3:
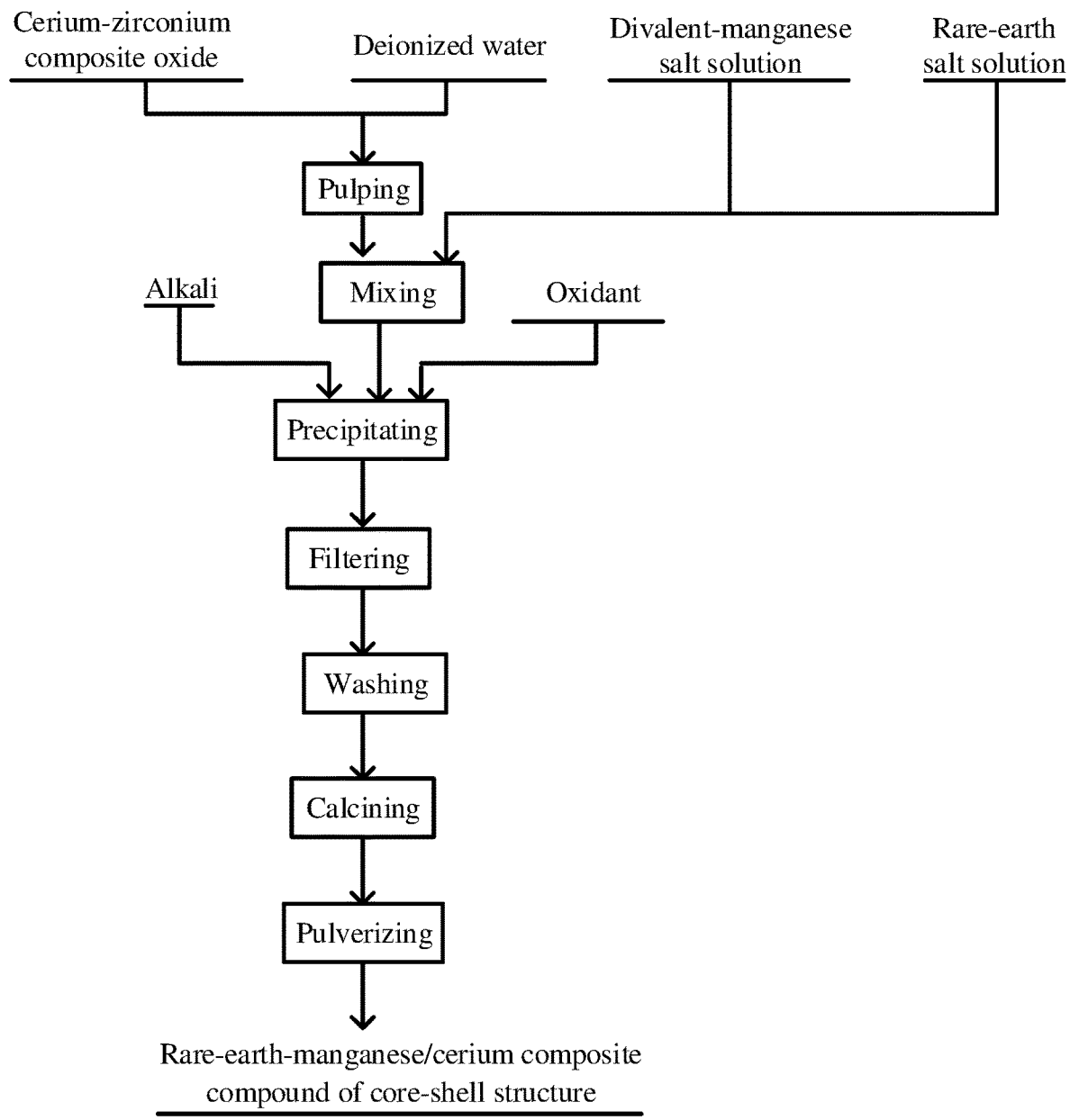
FIG. 3 is a flowchart of a method for preparing a rare-earth-manganese/cerium-zirconium-based composite compound according to yet another specific embodiment of the present invention.

As shown in FIG. 3, in a further specific embodiment, the method for preparing the rare-earth-manganese/cerium-zirconium-based composite compound includes the following steps.

First, a stoichiometric mixed solution of the divalent manganese salt solution and one or more rare-earth metal salt solutions, as required by a final product, is prepared with a concentration of 0.5-4.0 mol/L, preferably 1.0-2.5 mol/L, and specifically, a soluble nitrate, an acetate, a chloride and/or a sulfate, preferably the nitrate, are selected as sources of the rare-earth metal salt and the divalent manganese salt. The cerium-zirconium composite oxide is added with deionized water and pulped, so that that solid powder of the cerium-zirconium composite oxide is evenly dispersed in the deionized water, thereby obtaining a cerium-zirconium composite oxide slurry with a concentration of 10-50%, preferably 15-40%. Specifically, the soluble nitrate, the acetate, the chloride and/or sulfate, for example, $Mn(NO_3)_2$, $Mn(CH_3(COO)_2)$, $MnCl_2$, $MnSO_4$, may be selected as the sources of raw materials for the divalent manganese salt solution and the rare-earth metal salt solution. The cerium-zirconium composite oxide includes at least one selected from a group consisting of lanthanum, praseodymium, neodymium, europium, and yttrium.

Second, the mixed solution of the manganese salt solution and one or more rare-earth metal salt solutions is added to a cerium-zirconium composite oxide slurry to obtain a cerium-zirconium composite oxide slurry containing the mixed solution of manganese and rare earth salts. The mixed solution containing manganese and rare earth salts are uniformly dispersed in the cerium-zirconium slurry, so that the manganese and the rare earth may be co-precipitated on the cerium-zirconium composite oxide powder in a homogeneous phase.

Then, an alkali solution is added to the above slurry to precipitate a hydroxide containing a mullite structure on the solid powder of the cerium-zirconium composite oxide, and a pH value of the solution is controlled to be greater than 8 to obtain a precipitate. Specifically, the alkali includes sodium hydroxide, ammonia water, ammonium bicarbonate or potassium hydroxide, with an addition amount in the range of 0.5-5 mol/L, preferably 1.0-3.0 mol/L. The precipitate includes a mixed hydroxide of $Mn(OH)_2$ and $RE(OH)_3$ precipitated on the cerium-zirconium composite oxide. Specifically, a reaction formula is as follows:

$$RE^{3+}+2Mn^{2+}+7OH^-=RE(OH)_3.2Mn(OH)_2.$$

Next, an oxidant is added to the precipitate, wherein the oxidant has an amount of substance being 0.05-1 time, preferably 0.1-0.5 time, the amount of substance of $Mn^{2+}$. Specifically, the oxidant includes one selected from a group consisting of hydrogen peroxide, oxygen, ammonium persulfate, sodium persulfate and potassium persulfate. For example, a reaction formula of hydrogen peroxide is as follows:

$$Mn(OH)_2 + H_2O_2 = MnO(OH)_2 + H_2O.$$

The precipitant added with the oxidant is filtered and washed by using the deionized water, with a washing end-point at which a conductivity of the deionized water is less than 40 us/cm, preferably less than 20 us/cm. As such, soluble cations such as $K^+$, $Na^+$ and $NH_4^+$, soluble anions such as $Cl^-$, $SO_4^{2-}$ and $NO_3^-$ and other impurity ions are removed through washing. This is because the presence of impurity ions may easily cause high-temperature sintering of a synthesized composite compound, and reduction of the specific surface area and oxygen storage capacity.

After optional drying, the precipitate washed by using the deionized water is calcined and pulverized to obtain the rare-earth-manganese/cerium-zirconium-based composite compound of the core-shell structure. The calcining condition is as follows: keeping a temperature in the range of 500-900° C. for 1-6 h, preferably in the range of 700-850° C. for 3-5 h. The obtained rare-earth-manganese/cerium-zirconium-based composite compound of the core-shell structure has a particle size D50 of 1-15 μm, preferably 3-10 μm.

The rare-earth-manganese/cerium-zirconium-based composite compound of the core-shell structure prepared by the above method and the cerium-zirconium composite oxide may form a core-shell-structured $RE_cMn_aO_b$ oxide having a mullite structure, so that the oxygen storage capacity of the cerium-zirconium material is improved through the interface effect, thereby improving the oxidation rate of NO. A ratio of $RE_cB_aO_b$ oxide to the cerium-zirconium material may be regulated to meet the operating requirements of different DOC catalysts of diesel vehicles for the oxygen storage capacity and heat resistance of oxygen storage materials.

According to a third aspect of the present invention, a use of at least one of the rare-earth-manganese/cerium-zirconium-based composite compound according to any one described above, and the rare-earth-manganese/cerium-zirconium-based composite compound prepared by the method according to any one described above, as a catalyst, in the catalytic oxidation of NO is provided. The catalyst is for use in the DOC catalysts of diesel vehicles to increase the oxygen storage capacity of the oxygen storage material and promote the oxidation of NO, thereby increasing the conversion rate of NO to $NO_2$.

Unless otherwise specified, the raw materials in the embodiments of the present invention are all commercially available.

Moreover, the cerium-zirconium composite oxide used in each embodiment was prepared according to a method described in the patent NO. ZL201010294878.2.

Embodiment 1

$0.10CeMn_2O_5 - 0.90Ce_{0.4}Zr_{0.6}O_{1.94}$ 5 mL of $Ce(NO_3)_3$ solution with a concentration of 3 mol/L and 6 mL of $Mn(NO_3)_2$ solution with a concentration of 5 mol/L were respectively poured into a 100 mL beaker, and stirred magnetically for 10 min to obtain a mixed solution of Ce and Mn. 45 g of cerium-zirconium composite oxide powder with a formula of $Ce_{0.4}Zr_{0.6}O_{1.94}$ was weighed and put in a 250 mL beaker.

A mixed solution of Ce and Mn was dropwise added to cerium-zirconium composite oxide powder under stirring. After the addition of the solution was completed, a resultant was stirred for 10 min, taken out and dried in an oven at 160° C. for 24 h, then calcined in a muffle furnace at 750° C. for 5 h, and taken out and ground to obtain a product with D50=2 μm.

0.1 g of the composite compound prepared above was placed in a Chembet PULSAR TPR/TPD type chemical adsorption instrument, and then tested in terms of oxygen storage and release capacities by an oxygen pulse method, which specifically included the following steps: He was used for purging at first; the temperature was raised to 150° C. and continuously to 800° C., and then, 10% $H_2/Ar$ was used for reduction for 1 h; in a He gas flow, the temperature of a reactor was reduced to 500° C., and residual $H_2$ was completely purged; then high-purity $O_2$ was introduced in a pulsating manner at 500° C.; and by counting the consumed O2 peak area, a total oxygen storage capacity was calculated as 821 umol $O_2/g$.

Embodiment 2

$0.15YMn_2O_5 - 0.85Ce_{0.3}Zr_{0.6}La_{0.1}O_{1.89}$ 9 mL of $Y(COOH)_3$ solution with a concentration of 3 mol/L and 12 mL of $Mn(COOH)_3$ solution with a concentration of 4.5 mol/L were respectively poured into a 200 mL beaker, and stirred magnetically for 10 min to obtain a mixed solution of Y and Mn. 42.5 g of cerium-zirconium composite oxide powder with a formula of $Ce_{0.3}Zr_{0.6}La_{0.1}O_{1.89}$ was weighed and put in a 250 mL beaker. A mixed solution of Y and Mn was dropwise added to the cerium-zirconium composite oxide powder under stirring. After the addition of the solution was completed, a resultant was stirred for 10 min, taken out and dried in an oven at 170° C. for 24 h, then calcined in a muffle furnace at 770° C. for 5 h, and taken out and ground to obtain a product with D50=3.6 μm.

For a composite compound prepared above, the same method for testing the oxygen storage capacity as in Embodiment 1 was used to calculate a total oxygen storage capacity to be 857 umol $O_2/g$ by counting the consumed O2 peak area.

Embodiment 3

$0.2LaMn_2O_5 - 0.8Ce_{0.4}Zr_{0.5}La_{0.05}Pr_{0.05}O_{1.92}$ 10.5 mL of $La(COOH)_3$ solution with a concentration of 3 mol/L and 14 mL of $Mn(COOH)_2$ solution with a concentration of 4.5 mol/L were respectively poured into a 200 mL beaker, and stirred magnetically for 10 min to obtain a mixed solution of La and Mn. 40 g of cerium-zirconium composite oxide powder with a formula of $Ce_{0.4}Zr_{0.5}La_{0.05}Pr_{0.05}O_{1.92}$ was weighed and put in a 250 mL beaker. A mixed solution of La and Mn was dropwise added to cerium-zirconium composite oxide powder under stirring. After the addition of the solution was completed, a resultant was stirred for 10 min, taken out and dried in an oven at 180° C. for 24 h, then calcined in a muffle furnace at 900° C. for 1 h, and taken out and ground to obtain a product with D50=15 μm.

For a composite compound prepared above, the same method for testing the oxygen storage capacity as in Embodiment 1 was used to calculate a total oxygen storage capacity to be 894 umol $O_2/g$ by counting the consumed O2 peak area.

Embodiment 4

$0.25SmMn_2O_5 - 0.75Ce_{0.2}Zr_{0.7}La_{0.03}Nd_{0.07}O_{1.9}$ 12.5 mL of $Sm(NO_3)_3$ solution with a concentration of 3 mol/L and 15 mL of $Mn(NO_3)_2$ solution with a concentraof 5 mol/L were respectively poured into a 200 mL beaker, and stirred magnetically for 10 min to obtain a mixed solution of Sm and Mn. 37.5 g of cerium-zirconium composite oxide powder with a formula of $Ce_{0.2}Zr_{0.7}La_{0.03}Nd_{0.07}O_{1.9}$ was weighed and put in a 250 mL beaker. A mixed solution of Sm and Mn was dropwise added to cerium-zirconium composite oxide powder under stirring. After the addition of the solution was completed, a resultant was stirred for 10 min, taken out and dried in an oven at 190° C. for 24 h, then calcined in a muffle furnace at 500° C. for 6 h, and taken out and ground to obtain a product with D50=1.2 m.

For a composite compound prepared above, the same method for testing the oxygen storage capacity as in Embodiment 1 was used to calculate a total oxygen storage capacity to be 924 umol $O_2$/g.

Embodiment 5

$0.3La_{0.33}Sm_{0.67}Mn_2O_5$-$0.7Ce_{0.6}Zr_{0.3}La_{0.05}Y_{0.05}O_{1.94}$ 5 mL of $LaNO_3$ solution with a concentration of 3 mol/L, 10 mL of $Sm(NO_3)_3$ solution with a concentration of 3 mol/L, and 18 mL of $Mn(NO_3)_2$ solution with a concentration of 5 mol/L were respectively poured into a 200 mL beaker, and stirred magnetically for 10 min to obtain a mixed solution of La, Sm and Mn. 35 g of cerium-zirconium composite oxide powder with a formula of $Ce_{0.6}Zr_{0.3}La_{0.05}Y_{0.05}O_{1.94}$ was weighed and put in a 250 mL beaker. A mixed solution of La, Sm and Mn was dropwise added to cerium-zirconium composite oxide powder under stirring. After the addition of the solution was completed, a resultant was stirred for 10 min, taken out and dried in an oven at 200° C. for 24 h, then calcined in a muffle furnace at 850° C. for 5 h, and taken out and ground to obtain a product with D50=9.9 μm.

For a composite compound prepared above, the same method for testing the oxygen storage capacity as in Embodiment 1 was used to calculate a total oxygen storage capacity to be 957 umol $O_2$/g.

Embodiment 6

$0.3La_{0.2}Ce_{0.2}Y_{0.6}Mn_2O_5$-$0.7Ce_{0.4}Zr_{0.5}La_{0.02}Nd_{0.05}Y_{0.03}O_{1.95}$ 4 mL of $LaNO_3$ solution with a concentration of 3 mol/L, 4 mL of $Ce(NO_3)_3$ solution with a concentration of 3 mol/L, and 7 mL of $Mn(NO_3)_2$ solution with a concentration of 5 mol/L were respectively poured into a 100 mL beaker, and stirred magnetically for 10 min to obtain a mixed solution of Ce, Y and Mn. 35 g of cerium-zirconium composite oxide powder with a formula of $Ce_{0.4}Zr_{0.5}La_{0.02}Nd_{0.05}Y_{0.03}O_{1.95}$ was weighed and put in a 250 mL beaker. A mixed solution of Ce, Y and Mn was dropwise added to cerium-zirconium composite oxide powder under stirring. After the addition of the solution was completed, a resultant was stirred for 10 min, taken out and dried in an oven at 210° C. for 24 h, then calcined in a muffle furnace at 810° C. for 3 h, and taken out and ground to obtain a product with D50=4.3 μm.

For a composite compound prepared above, the same method for testing the oxygen storage capacity as in Embodiment 1 was used to calculate a total oxygen storage capacity to be 1067 umol $O_2$/g.

Embodiment 7

$0.10Ce_{0.25}MnO_2$-$0.90Ce_{0.4}Zr_{0.5}Y_{0.1}O_{1.94}$ 2.5 mL of $Ce(NO_3)_3$ solution with a concentration of 3 mol/L and 6 mL of $Mn(NO_3)_2$ solution with a concentration of 5 mol/L were respectively poured into a 100 mL beaker, and stirred magnetically for 10 min to obtain a mixed solution of Ce and Mn. 45 g of cerium-zirconium composite oxide powder with a formula of $Ce_{0.4}Zr_{0.5}Y_{0.1}O_{1.94}$ was weighed and put in a 250 mL beaker. A mixed solution of Ce and Mn was dropwise added to cerium-zirconium composite oxide powder under stirring. After the addition of the solution was completed, a resultant was stirred for 10 min, taken out and dried in an oven at 210° C. for 24 h, then calcined in a muffle furnace at 820° C. for 4 h, and taken out and ground to obtain a product with D50=5.6 m.

For a composite compound prepared above, the same method for testing the oxygen storage capacity as in Embodiment 1 was used to calculate a total oxygen storage capacity to be 847 umol $O_2$/g.

Embodiment 8

$0.15Y_4Mn_8O_{18}$-$0.85Ce_{0.3}Zr_{0.6}La_{0.1}O_{1.89}$ 9 mL of $Y(COOH)_3$ solution with a concentration of 3 mol/L and 12 mL of $Mn(COOH)_3$ solution with a concentration of 4.5 mol/L were respectively poured into a 200 mL beaker, and stirred magnetically for 10 min to obtain a mixed solution of Y and Mn. 42.5 g of cerium-zirconium composite oxide powder with a formula of $Ce_{0.3}Zr_{0.6}La_{0.1}O_{1.89}$ was weighed and put in a 250 mL beaker. A mixed solution of Y and Mn was dropwise added to the cerium-zirconium composite oxide powder under stirring. After the addition of the solution was completed, a resultant was stirred for 10 min, taken out and dried in an oven at 220° C. for 24 h, then calcined in a muffle furnace at 830° C. for 5 h, and taken out and ground to obtain a product with D50=3.5 μm.

For a composite compound prepared above, the same method for testing the oxygen storage capacity as in Embodiment 1 was used to calculate a total oxygen storage capacity to be 857 umol $O_2$/g by counting the consumed O2 peak area.

Embodiment 9

$0.2LaSmMn_3O_6$-$0.8Ce_{0.4}Zr_{0.5}La_{0.05}Pr_{0.05}O_{1.92}$ 7 mL of $La(COOH)_3$ solution with a concentration of 3 mol/L, 7 mL of $Sm(COOH)_3$ solution with a concentration of 3 mol/L, and 14 mL of $Mn(COOH)_2$ solution with a concentration of 4.5 mol/L were respectively poured into a 200 mL beaker, and stirred magnetically for 10 min to obtain a mixed solution of La, Sm and Mn. 40 g of cerium-zirconium composite oxide powder with a formula of $Ce_{0.4}Zr_{0.5}La_{0.05}Pr_{0.05}O_{1.92}$ was weighed and put in a 250 mL beaker. A mixed solution of La, Sm and Mn was dropwise added to cerium-zirconium composite oxide powder under stirring. After the addition of the solution was completed, a resultant was stirred for 10 min, taken out and dried in an oven at 220° C. for 24 h, then calcined in a muffle furnace at 840° C. for 5 h, and taken out and ground to obtain a product with D50=2.5 μm.

For a composite compound prepared above, the same method for testing the oxygen storage capacity as in Embodiment 1 was used to calculate a total oxygen storage capacity to be 928 umol $O_2$/g by counting the consumed O2 peak area.

Embodiment 10

$0.25EuMn_4O_7\text{-}0.75Ce_{0.2}Zr_{0.7}La_{0.03}Nd_{0.07}O_{1.9}$ 6.25 mL of $Eu(NO_3)_2$ solution with a concentration of 3 mol/L and 15 mL of $Mn(NO_3)_2$ solution with a concentration of 5 mol/L were respectively poured into a 200 mL beaker, and stirred magnetically for 10 min to obtain a mixed solution of Sm and Mn. 37.5 g of cerium-zirconium composite oxide powder with a formula of $Ce_{0.2}Zr_{0.7}La_{0.03}Nd_{0.07}O_{1.9}$ was weighed and put in a 250 mL beaker. A mixed solution of Sm and Mn was dropwise added to cerium-zirconium composite oxide powder under stirring. After the addition of the solution was completed, a resultant was stirred for 10 min, taken out and dried in an oven at 220° C. for 24 h, then calcined in a muffle furnace at 850° C. for 5 h, and taken out and ground to obtain a product with D50=6.6 m.

For a composite compound prepared above, the same method for testing the oxygen storage capacity as in Embodiment 1 was used to calculate a total oxygen storage capacity to be 1024 umol $O_2$/g.

Embodiment 11

$0.3Pr_3Mn_5O_{12}\text{-}0.7Ce_{0.6}Zr_{0.3}La_{0.5}Y_{0.05}O_{1.94}$ 18 mL of $Pr(NO_3)_3$ solution with a concentration of 3 mol/L and 18 mL of $Mn(NO_3)_2$ solution with a concentration of 5 mol/L were respectively poured into a 200 mL beaker, and stirred magnetically for 10 min to obtain a mixed solution of Pr and Mn. 35 g of cerium-zirconium composite oxide powder with a formula of $Ce_{0.6}Zr_{0.3}La_{0.05}Y_{0.05}O_{1.94}$ was weighed and put in a 250 mL beaker. A mixed solution of Pr and Mn was dropwise added to cerium-zirconium composite oxide powder under stirring. After the addition of the solution was completed, a resultant was stirred for 10 min, taken out and dried in an oven at 200° C. for 24 h, then calcined in a muffle furnace at 850° C. for 4 h, and taken out and ground to obtain a product with D50=4.6 m.

For a composite compound prepared above, the same method for testing the oxygen storage capacity as in Embodiment 1 was used to calculate a total oxygen storage capacity to be 897 umol $O_2$/g.

Embodiment 12

$0.3LaYCeMn_6O_{14}\text{-}0.7Ce_{0.6}Zr_{0.3}La_{0.05}Y_{0.05}O_{1.94}$ 5 mL of $La(NO_3)_3$ solution with a concentration of 3 mol/L, 5 mL of $Y(NO_3)_3$ solution with a concentration of 3 mol/L, 5 mL of $Ce(NO_3)_3$ solution with a concentration of 3 mol/L and 18 mL of $Mn(NO_3)_2$ solution with a concentration of 5 mol/L were respectively poured into a 200 mL beaker, and stirred magnetically for 10 min to obtain a mixed solution of La, Y, Ce and Mn. 35 g of cerium-zirconium composite oxide powder with a formula of $Ce_{0.6}Zr_{0.3}La_{0.05}Y_{0.05}O_{1.94}$ was weighed and put in a 250 mL beaker. A mixed solution of La, Y, Ce and Mn was dropwise added to the cerium-zirconium composite oxide powder under stirring. After the addition of the solution was completed, a resultant was stirred for 10 min, taken out and dried in an oven at 200° C. for 24 h, then calcined in a muffle furnace at 800° C. for 3 h, and taken out and ground to obtain a product with D50=7.6 μm.

For the oxygen storage material of the composite compound phase prepared above, the same method for testing the oxygen storage capacity as in Embodiment 1 was used to calculate a total oxygen storage capacity to be 987 umol $O_2$/g.

Embodiment 13

$0.2CeY_2Mn_7O_{15}\text{-}0.8Ce_{0.4}Zr_{0.5}La_{0.05}Pr_{0.05}O_{1.92}$ 3 mL of $Ce(COOH)_3$ solution with a concentration of 3 mol/L, 6 mL of $Y(COOH)_3$ solution with a concentration of 3 mol/L, and 14 mL of $Mn(COOH)_2$ solution with a concentration of 4.5 mol/L were respectively poured into a 200 mL beaker, and stirred magnetically for 10 min to obtain a mixed solution of Ce, Y and Mn. 40 g of cerium-zirconium composite oxide powder with a formula of $Ce_{0.4}Zr_{0.5}La_{0.05}Pr_{0.05}O_{1.92}$ was weighed and put in a 250 mL beaker. A mixed solution of Ce, Y and Mn was dropwise added to the cerium-zirconium composite oxide powder under stirring. After the addition of the solution was completed, a resultant was stirred for 10 min, taken out and dried in an oven at 180° C. for 24 h, then calcined in a muffle furnace at 790° C. for 5 h, and taken out and ground to obtain a product with D50=8.2 μm.

For a composite compound prepared above, the same method for testing the oxygen storage capacity as in Embodiment 1 was used to calculate a total oxygen storage capacity to be 874 umol $O_2$/g by counting the consumed 02 peak area.

Embodiment 14

$0.2LaCeNdMn_8O_{16}\text{-}0.8Ce_{0.4}Zr_{0.5}La_{0.02}Y_{0.08}O_{1.97}$ 2.6 mL of $La(COOH)_3$ solution with a concentration of 2.6 mol/L, 2.6 mL of $Ce(COOH)_3$ solution with a concentration of 3 mol/L, 2.6 mL of $Nd(COOH)_3$ solution with a concentration of 3 mol/L and 14 mL of $Mn(COOH)_2$ solution with a concentration of 4.5 mol/L were respectively poured into a 200 mL beaker, and stirred magnetically for 10 min to obtain a mixed solution of La, Ce, Nd and Mn. 40 g of cerium-zirconium composite oxide powder with a formula of $Ce_{0.4}Zr_{0.5}La_{0.02}Y_{0.05}O_{1.97}$ was weighed and put in a 250 mL beaker. A mixed solution of La, Ce, Nd and Mn was dropwise added to the cerium-zirconium composite oxide powder under stirring. After the addition of the solution was completed, a resultant was stirred for 10 min, then dried in an oven at 210° C. for 24 h, then calcined in a muffle furnace at 780° C. for 5 h, and taken out and ground to obtain a product with D50=3.6 μm.

For a composite compound prepared above, the same method for testing the oxygen storage capacity as in Embodiment 1 was used to calculate a total oxygen storage capacity to be 994 umol $O_2$/g by counting the consumed 02 peak area.

It can be concluded from the above embodiments that the composite compound prepared based on the ratio and method for preparing the rare-earth-manganese-supported cerium-zirconium composite compound according to the embodiments of the present invention has a higher oxygen storage capacity, which is not less than 800 umol $O_2$/g.

Embodiment 15

$0.10CeMn_2O_5\text{-}0.90Ce_{0.4}Zr_{0.6}O_{1.95}$ 10 mL of $CeCl_3$ solution with a concentration of 1.5 mol/L and 20 mL of $MnCl_2$ solution with a concentration of 1.5 mol/L were respectively poured into a 100 mL beaker, and well mixed after being stirred magnetically for 10 min. 45 g of cerium-zirconium composite oxide powder with a formula of $Ce_{0.4}Zr_{0.6}O_{1.95}$ was weighed and added to a beaker containing 405 mL of deionized water, and magnetically stirred for 30 min to form a uniformly dispersed slurry. A well-mixed cerium-manganese solution was added to the above slurry, and magnetically stirred for 10 min. 43 mL of 2.5 mol/L NaOH solution was taken, added dropwise to the above slurry mixed with the cerium-manganese solution, and kept stirred magnetically for 1 h. After the addition of the NaOH solution was completed, stirring was continued for 10 min, then 4 mL of 30% $H_2O_2$ was added, and the stirring was continued for 30 min. The above precipitate was filtered, washed and cleaned with deionized water, dried in an oven at 160° C. for 24 h, then calcined in a muffle furnace at 750° C. for 5 h, and taken out and ground to obtain a product with D50=3.2 m.

0.1 g of the composite compound prepared above was placed in a Chembet PULSAR TPR/TPD type chemical adsorption instrument, and then tested in terms of oxygen storage and release capacities by an oxygen pulse method, which specifically included the following steps: He was used for purging at first; the temperature was raised to 150° C. and continuously to 800° C., then, 10% $H_2$/Ar was used for reduction for 1 h; in a He gas flow, the temperature of a reactor was reduced to 500° C., and residual $H_2$ was completely purged; then high-purity $O_2$ was introduced in a pulsating manner at 500° C.; and by counting the consumed 02 peak area, a total oxygen storage capacity was calculated as 821 umol $O_2$/g.

Embodiment 16

$0.15YMn_2O_5\text{-}0.85Ce_{0.3}Zr_{0.6}La_{0.1}O_{1.92}$ 18 mL of $YCl_3$ solution with a concentration of 1.5 mol/L and 36 mL of $MnCl_2$ solution with a concentration of 1.5 mol/L were respectively poured into a 200 mL beaker, and well mixed after being stirred magnetically for 10 min. 42.5 g of cerium-zirconium composite oxide powder with a formula of $Ce_{0.3}Zr_{0.6}La_{0.1}O_{1.92}$ was weighed and added to a beaker containing 240 mL of deionized water, and magnetically stirred for 30 min to form a uniformly dispersed slurry. A well-mixed yttrium-manganese solution was added to the above slurry, and magnetically stirred for 10 min. 80 mL of 2 mol/L NaOH solution was taken, added dropwise to the above slurry mixed with the yttrium-manganese solution, and kept stirred magnetically for 1 h. After the addition of the NaOH solution was completed, stirring was continued for 10 min, then 6 mL of 30% $H_2O_2$ was added, and the stirring was continued for 30 min. The above precipitate was filtered, washed and cleaned with deionized water, dried in an oven at 170° C. for 24 h, then calcined in a muffle furnace at 800° C. for 5 h, and taken out and ground to obtain a product with D50=1.3 μm.

For a composite compound prepared above, the same method for testing the oxygen storage capacity as in Embodiment 1 was used to calculate a total oxygen storage capacity to be 857 umol $O_2$/g by counting the consumed 02 peak area.

Embodiment 17

$0.2LaMn_2O_5\text{-}0.8Ce_{0.4}Zr_{0.5}La_{0.05}Pr_{0.05}O_{1.93}$ 21 mL of $LaCl_3$ solution with a concentration of 1.5 mol/L and 42 mL of $MnCl_2$ solution with a concentration of 1.5 mol/L were respectively poured into a 200 mL beaker, and well mixed after being stirred magnetically for 10 min. 40 g of cerium-zirconium composite oxide powder with a formula of $Ce_{0.4}Zr_{0.5}La_{0.05}Pr_{0.05}O_{1.93}$ was weighed and added to a beaker containing 160 mL of deionized water, and magnetically stirred for 30 min to form a uniformly dispersed slurry. A well-mixed lanthanum-manganese solution was added to the above slurry, and magnetically stirred for 10 min. 100 mL of 1.5 mol/L NaOH solution was taken, added dropwise to the above slurry mixed with the lanthanum-manganese solution, and kept stirred magnetically for 1 h. After the addition of the NaOH solution was completed, stirring was continued for 10 min, then 7 mL of 30% $H_2O_2$ was added, and the stirring was continued for 30 min. The above precipitate was filtered, washed and cleaned with deionized water, dried in an oven at 180° C. for 24 h, then calcined in a muffle furnace at 850° C. for 4 h, and taken out and ground to obtain a product with D50=4.5 μm.

For a composite compound prepared above, the same method for testing the oxygen storage capacity as in Embodiment 1 was used to calculate a total oxygen storage capacity to be 894 umol $O_2$/g by counting the consumed 02 peak area.

Embodiment 18

$0.25SmMn_2O_5\text{-}0.75Ce_{0.2}Zr_{0.7}La_{0.03}Nd_{0.07}O_{1.94}$ 25 mL of $SmCl_3$ solution with a concentration of 1.5 mol/L and 50 mL of $MnCl_2$ solution with a concentration of 1.5 mol/L were respectively poured into a 200 mL beaker, and well mixed after being stirred magnetically for 10 min. 37.5 g of cerium-zirconium composite oxide powder with a formula of $Ce_{0.2}Zr_{0.7}La_{0.03}Nd_{0.07}O_{1.94}$ was weighed and added to a beaker containing 115 mL of deionized water, and magnetically stirred for 30 min to form a uniformly dispersed slurry. A well-mixed samarium-manganese solution was added to the above slurry, and magnetically stirred for 10 min. 150 mL of 1 mol/L NaOH solution was taken, added dropwise to the above slurry mixed with the samarium-manganese solution, and kept stirred magnetically for 1 h. After the addition of the NaOH solution was completed, stirring was continued for 10 min, then 8 mL of 30% $H_2O_2$ was added, and the stirring was continued for 30 min. The above precipitate was filtered, washed and cleaned with deionized water, dried in an oven at 180° C. for 24 h, then calcined in a muffle furnace at 750° C. for 3 h, and taken out and ground to obtain a product with D50=15.0 μm.

For a composite compound prepared above, the same method for testing the oxygen storage capacity as in Embodiment 1 was used to calculate a total oxygen storage capacity to be 924 umol $O_2$/g.

Embodiment 19

$0.3La_{0.33}Sm_{0.67}Mn_2O_5\text{-}0.7Ce_{0.6}Zr_{0.3}La_{0.05}Y_{0.05}O_{1.96}$ 10 mL of $LaNO_3$ solution with a concentration of 1.5 mol/L, 20 mL of $Sm(NO_3)_3$ solution with a concentration of 1.5 mol/L, and 60 mL of $Mn(NO_3)_2$ with a concentration of 1.5 mol/L were respectively poured into a 200 mL beaker, and stirred magnetically for 10 min. 35 g of cerium-zirconium composite oxide powder with a formula of $Ce_{0.6}Zr_{0.3}La_{0.05}Y_{0.05}O_{1.96}$ was weighed and added to a beaker containing 150 mL of deionized water, and magnetically stirred for 30 min to form a uniformly dispersed slurry. A well-mixed lanthanum-samarium-manganese solution was added to the above slurry, and magnetically stirred for 10 min. 110 mL of 3 mol/L NaOH solution was taken, added dropwise to the above slurry mixed with the lanthanum-samarium-manganese solution, and kept stirred magnetically for 1 h. After the addition of the NaOH solution was completed, stirring was continued for 10 min, then 10 mL of 30% $H_2O_2$ was added, and the stirring was continued for 30 min. The above precipitate was filtered, washed and cleaned with deionized water, dried in an oven at 190° C. for 24 h, then calcined in a muffle furnace at 500° C. for 6 h, and taken out and ground to obtain a product with D50=10.8 μm.

For a composite compound prepared above, the same method for testing the oxygen storage capacity as in Embodiment 1 was used to calculate a total oxygen storage capacity to be 957 umol $O_2$/g.

Embodiment 20

$0.3La_{0.2}Ce_{0.2}Y_{0.6}Mn_2O_5$-$0.7Ce_{0.4}Zr_{0.5}La_{0.02}Nd_{0.05}Y_{0.03}O_{1.97}$ 8 mL of $LaNO_3$ solution with a concentration of 1.5 mol/L, 8 mL of $Ce(NO_3)_3$ solution with a concentration of 1.5 mol/L, and 24 mL of $Mn(NO_3)_2$ with a concentration of 1.5 mol/L were respectively poured into a 100 mL beaker, and stirred magnetically for 10 min. 35 g of cerium-zirconium composite oxide powder with a formula of $Ce_{0.4}Zr_{0.5}La_{0.02}Nd_{0.05}Y_{0.03}O_{1.97}$ was weighed and added to a beaker containing 85 mL of deionized water, and magnetically stirred for 30 min to form a uniformly dispersed slurry. A well-mixed lanthanum-cerium-yttrium-manganese solution was added to the above slurry, and magnetically stirred for 10 min. 84 mL of 5 mol/L ammonia water was taken, added dropwise to the above slurry mixed with the lanthanum-cerium-yttrium-manganese solution, and kept stirred magnetically for 1 h. After the addition of the NaOH solution was completed, stirring was continued for 10 min, then 13 mL of 30% $H_2O_2$ was added, and the stirring was continued for 30 min. The above precipitate was filtered, washed and cleaned with deionized water, dried in an oven at 190° C. for 24 h, then calcined in a muffle furnace at 900° C. for 1 h, and taken out and ground to obtain a product with D50=4.2 μm.

For a composite compound prepared above, the same method for testing the oxygen storage capacity as in Embodiment 1 was used to calculate a total oxygen storage capacity to be 997 umol $O_2$/g.

Embodiment 21

$0.3Y_{0.5}MnO_{2.5}$-$0.7Ce_{0.4}Zr_{0.5}La_{0.05}Y_{0.05}O_{1.92}$ 15 mL of $YNO_3$ solution with a concentration of 1.5 mol/L and 24 mL of $Mn(NO_3)_2$ solution with a concentration of 1.5 mol/L were respectively poured into a 100 mL beaker, and well mixed after being stirred magnetically for 10 min. 35 g of cerium-zirconium composite oxide powder with a formula of $Ce_{0.4}Zr_{0.5}La_{0.05}Y_{0.05}O_{1.92}$ was weighed and added to a beaker containing 65 mL of deionized water, and magnetically stirred for 30 min to form a uniformly dispersed slurry.

A well-mixed yttrium-manganese solution was added to the above slurry, and magnetically stirred for 10 min. 840 mL of 0.5 mol/L ammonia water was taken, added dropwise to the above slurry mixed with the yttrium-manganese solution, and kept stirred magnetically for 1 h. After the addition of the NaOH solution was completed, stirring was continued for 10 min, then 13 mL of 30% $H_2O_2$ was added, and the stirring was continued for 30 min. The above precipitate was filtered, washed and cleaned with deionized water, dried in an oven at 200° C. for 24 h, then calcined in a muffle furnace at 800° C. for 5 h, and taken out and ground to obtain a product with D50=5.3 μm.

For a composite compound prepared above, the same method for testing the oxygen storage capacity as in Embodiment 1 was used to calculate a total oxygen storage capacity to be 1002 umol $O_2$/g.

Embodiment 22

$0.25Ce_{0.5}YMn_3O_{7.5}$-$0.75Ce_{0.2}Zr_{0.7}La_{0.05}Nd_{0.05}O_{1.94}$ 17 mL of $CeCl_3$ solution with a concentration of 1.5 mol/L, 33 mL of $YCl_3$ solution with a concentration of 1.5 mol/L and 50 mL of $MnCl_2$ solution with a concentration of 1.5 mol/L were respectively poured into a 200 mL beaker, and well mixed after being stirred magnetically for 10 min. 37.5 g of cerium-zirconium composite oxide powder with a formula of $Ce_{0.2}Zr_{0.7}La_{0.05}Nd_{0.05}O_{1.94}$ was weighed and added to a beaker containing 55 mL of deionized water, and magnetically stirred for 30 min to form a uniformly dispersed slurry. A well-mixed cerium-yttrium-manganese solution was added to the above slurry, and magnetically stirred for 10 min. 103 mL of 2.5 mol/L NaOH solution was taken, added dropwise to the above slurry mixed with the cerium-yttrium-manganese solution, and kept stirred magnetically for 1 h. After the addition of the NaOH solution was completed, stirring was continued for 10 min, then 8 mL of 30% $H_2O_2$ was added, and the stirring was continued for 30 min. The above precipitate was filtered, washed and cleaned with deionized water, dried in an oven at 200° C. for 24 h, then calcined in a muffle furnace at 810° C. for 4 h, and taken out and ground to obtain a product with D50=6.9 μm.

For a composite compound prepared above, the same method for testing the oxygen storage capacity as in Embodiment 1 was used to calculate a total oxygen storage capacity to be 921 umol $O_2$/g.

Embodiment 23

$0.2La_{1.25}Mn_{2.5}O_{7.25}$-$0.8Ce_{0.4}Zr_{0.5}La_{0.05}Pr_{0.05}O_{1.93}$:

21 mL of $LaCl_3$ solution with a concentration of 1.5 mol/L and 42 mL of $MnCl_2$ solution with a concentration of 1.5 mol/L were respectively poured into a 200 mL beaker, and well mixed after being stirred magnetically for 10 min. 40 g of cerium-zirconium composite oxide powder with a formula of $Ce_{0.4}Zr_{0.5}La_{0.05}Pr_{0.05}O_{1.93}$ was weighed and added to a beaker containing 45 mL of deionized water, and magnetically stirred for 30 min to form a uniformly dispersed slurry.

A well-mixed lanthanum-manganese solution was added to the above slurry, and magnetically stirred for 10 min. 105 mL of 2 mol/L NaOH solution was taken, added dropwise to the above slurry mixed with the lanthanum-manganese solution, and kept stirred magnetically for 1 h. After the addition of the NaOH solution was completed, stirring was continued for 10 min, then 7 mL of 30% $H_2O_2$ was added, and the stirring was continued for 30 min. The above precipitate was filtered, washed and cleaned with deionized water, dried in an oven at 210° C. for 24 h, then calcined in a muffle furnace at 820° C. for 5 h, and taken out and ground to obtain a product with D50=7.6 μm.

For a composite compound prepared above, the same method for testing the oxygen storage capacity as in Embodiment 1 was used to calculate a total oxygen storage capacity to be 894 umol $O_2$/g by counting the consumed $O_2$ peak area.

Embodiment 24

$0.15Ce_{0.4}Sm_{0.4}Mn_{1.6}O_4$-$0.85Ce_{0.3}Zr_{0.6}La_{0.1}O_{1.92}$ 9 mL of $CeCl_3$ solution with a concentration of 1.5 mol/L, 9 mL of $SmCl_3$ solution with a concentration of 1.5 mol/L and 36 mL of $MnCl_2$ solution with a concentration of 1.5 mol/L were respectively poured into a 200 mL beaker, and well mixed after being stirred magnetically for 10 min. 42.5 g of cerium-zirconium composite oxide powder with a formula of $Ce_{0.3}Zr_{0.6}La_{0.1}O_{1.92}$ was weighed and added to a beaker containing 45 mL of deionized water, and magnetically stirred for 30 min to form a uniformly dispersed slurry. A well-mixed cerium-samarium-manganese solution was added to the above slurry, and magnetically stirred for 10 min. 100 mL of 1.5 mol/L NaOH solution was taken, added dropwise to the above slurry mixed with the cerium-samarium-manganese solution, and kept stirred magnetically for 1 h. After the addition of the NaOH solution was completed, stirring was continued for 10 min, then 6 mL of 30% $H_2O_2$ was added, and the stirring was continued for 30 min. The above precipitate was filtered, washed and cleaned with deionized water, dried in an oven at 210° C. for 24 h, then calcined in a muffle furnace at 820° C. for 3 h, and taken out and ground to obtain a product with D50=8.5 μm.

For a composite compound prepared above, the same method for testing the oxygen storage capacity as in Embodiment 1 was used to calculate a total oxygen storage capacity to be 899 umol $O_2$/g by counting the consumed 02 peak area.

Embodiment 25

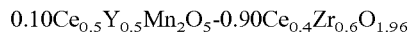

7.5 mL of $Ce(NO_3)_3$ solution with a concentration of 2 mol/L, 7.5 mL of $Y(NO_3)_3$ solution with a concentration of 2 mol/L, and 15 mL of $Mn(NO_3)_2$ with a concentration of 4.5 mol/L were respectively poured into a 100 mL beaker, and well mixed after being stirred magnetically for 10 min. 90 g of cerium-zirconium composite oxide powder with a formula of $0.90Ce_{0.4}Zr_{0.6}O_{1.96}$ was weighed and put in a 250 mL beaker. A mixed solution of Ce, Y and Mn was dropwise added to cerium-zirconium composite oxide powder under stirring. After the addition of the solution was completed, a resultant was stirred for 10 min, then dried in an oven at 220° C. for 24 h, then calcined in a muffle furnace at 850° C. for 5 h, and taken out and ground to obtain a product with D50=9.2 μm.

For a composite compound prepared above, the same method for testing the oxygen storage capacity as in Embodiment 1 was used to calculate a total oxygen storage capacity to be 987 umol $O_2$/g.

Embodiment 26

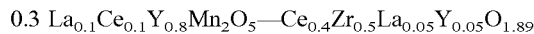

2.5 mL of $La(NO_3)_3$ solution with a concentration of 2 mol/L, 2.5 mL of $Ce(NO_3)_3$ solution with a concentration of 2 mol/L, 10 mL of $Y(NO_3)_3$ with a concentration of 4 mol/L, and 23 mL of $Mn(NO_3)_2$ solution with a concentration of 4.5 mol/L were respectively poured into a 100 mL beaker, and well mixed after being stirred magnetically for 10 min. 35 g of cerium-zirconium composite oxide powder with a formula of $Ce_{0.4}Zr_{0.5}La_{0.05}Y_{0.05}O_{1.89}$ was weighed and put in a 250 mL beaker. A solution of La, Ce, Y and Mn was dropwise added to the cerium-zirconium composite oxide powder under stirring. After the addition of the solution was completed, a resultant was stirred for 10 min, then dried in an oven at 220° C. for 24 h, then calcined in a muffle furnace at 850° C. for 5 h, and taken out and ground to obtain a product with D50=3.6 m.

For a composite compound prepared above, the same method for testing the oxygen storage capacity as in Embodiment 1 was used to calculate a total oxygen storage capacity to be 1017 umol $O_2$/g.

Embodiment 27

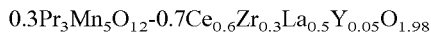

4 mL of $Ce(NO_3)_3$ solution with a concentration of 3 mol/L, 8 mL of $Sm(NO_3)_3$ solution with a concentration of 3 mol/L, and 15 mL of $Mn(NO_3)_2$ with a concentration of 5 mol/L were respectively poured into a 200 mL beaker, and stirred magnetically for 10 min. 37.5 g of cerium-zirconium composite oxide powder with a formula of $Ce_{0.2}Zr_{0.7}La_{0.03}Nd_{0.07}O_{1.9}$ was weighed and put in a 250 mL beaker. A mixed solution of Sm and Mn was dropwise added to cerium-zirconium composite oxide powder under stirring. After the addition of the solution was completed, a resultant was stirred for 10 min, dried in an oven at 180° C. for 24 h, then calcined in a muffle furnace at 750° C. for 5 h, and taken out and ground to obtain a product with D50=3.9 μm.

For a composite compound prepared above, the same method for testing the oxygen storage capacity as in Embodiment 1 was used to calculate a total oxygen storage capacity to be 1067 umol $O_2$/g.

Embodiment 28

$0.3Pr_3Mn_5O_{12}$-$0.7Ce_{0.6}Zr_{0.3}La_{0.05}Y_{0.05}O_{1.98}$ 18 mL of $Pr(NO_3)_3$ solution with a concentration of 3 mol/L and 18 mL of $Mn(NO_3)_2$ solution with a concentration of 5 mol/L were respectively poured into a 200 mL beaker, and well mixed after being stirred magnetically for 10 min. 35 g of cerium-zirconium composite oxide powder with a formula of $Ce_{0.6}Zr_{0.3}La_{0.05}Y_{0.05}O_{1.98}$ was weighed and put in a 250 mL beaker.

A mixed solution of Pr and Mn was dropwise added to cerium-zirconium composite oxide powder under stirring. After the addition of the solution was completed, a resultant was stirred for 10 min, taken out and dried in an oven at 200° C. for 24 h, then calcined in a muffle furnace at 850° C. for 5 h, and taken out and ground to obtain a product with D50=4.6 μm.

For a composite compound prepared above, the same method for testing the oxygen storage capacity as in Embodiment 1 was used to calculate a total oxygen storage capacity to be 914 umol $O_2$/g.

Embodiment 29

18 mL of $Y(NO_3)_3$ solution with a concentration of 3 mol/L and 18 mL of $Mn(NO_3)_2$ solution with a concentration of 5 mol/L were respectively poured into a 200 mL beaker, and well mixed after being stirred magnetically for 10 min. 35 g of cerium-zirconium composite oxide powder with a formula of $Ce_{0.4}Zr_{0.5}La_{0.05}Pr_{0.05}O_{1.95}$ was weighed and put in a 250 mL beaker. A mixed solution of Y and Mn was dropwise added to cerium-zirconium composite oxide powder under stirring. After the addition of the solution was completed, a resultant was stirred for 10 min, taken out and dried in an oven at 200° C. for 24 h, then calcined in a muffle furnace at 850° C. for 5 h, and taken out and ground to obtain a product with D50=4.8 μm.

For a composite compound prepared above, the same method for testing the oxygen storage capacity as in Embodiment 1 was used to calculate a total oxygen storage capacity to be 945 umol $O_2$/g.

Embodiment 30

18 mL of $Y(NO_3)_3$ solution with a concentration of 3 mol/L, 17 mL of $Mn(NO_3)_2$ solution with a concentration of 5 mol/L and 1 mL of $Fe(NO_3)_2$ with a concentration of 5 mol/L were respectively poured into a 200 mL beaker, and well mixed after being stirred magnetically for 10 min. 35 g of cerium-zirconium composite oxide powder with a formula of $Ce_{0.4}Zr_{0.5}La_{0.05}Pr_{0.05}O_{1.95}$ was weighed and put in a 250 mL beaker. A mixed solution of Y, Mn and Fe was dropwise added to cerium-zirconium composite oxide powder under stirring. After the addition of the solution was completed, a resultant was stirred for 10 min, taken out and dried in an oven at 200° C. for 24 h, then calcined in a muffle furnace at 850° C. for 5 h, and taken out and ground to obtain a product with D50=4.7 μm.

For a composite compound prepared above, the same method for testing the oxygen storage capacity as in Embodiment 1 was used to calculate a total oxygen storage capacity to be 1324 umol $O_2$/g.

It can be concluded from the above embodiments that the oxygen storage material prepared based on the ratio and method for preparing the mullite-structured rare-earth-manganese/cerium-zirconium composite compound according to the embodiments of the present invention has a higher oxygen storage capacity, which is not less than 800 umol $O_2$/g.

Embodiment 31

Figure 4:
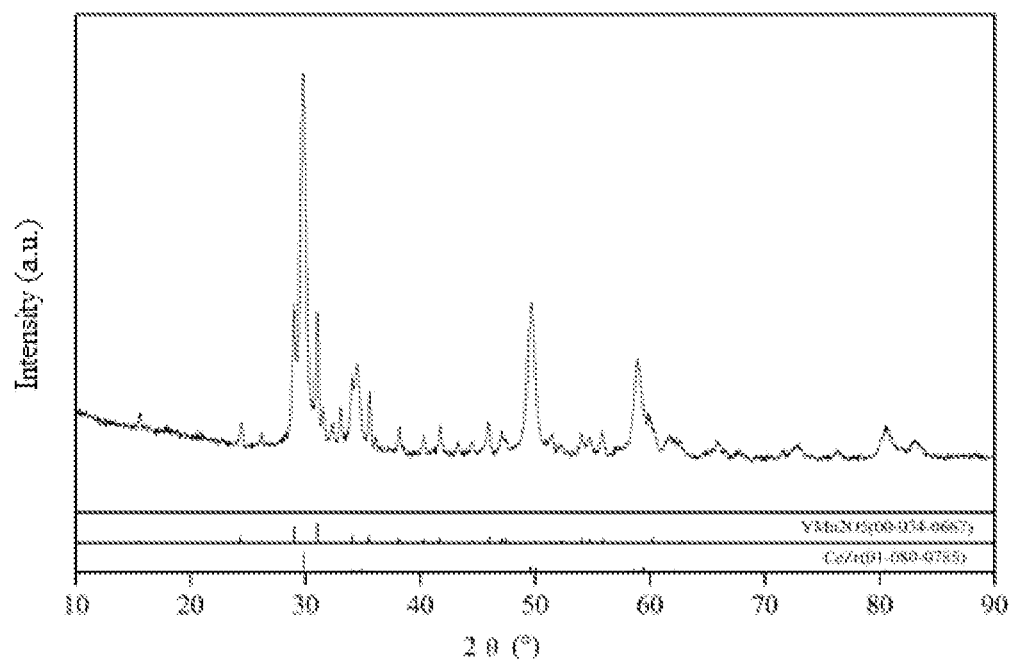
FIG. 4 is an X-ray diffraction pattern of a rare-earth-manganese/cerium-zirconium-based composite compound according to Embodiment 29 of the present invention.

FIG. 4 is an X-ray diffraction pattern of $0.3YMn_2O_5$-$0.7Ce_{40}Zr_{50}La_5Pr_5O_{1.95}$ prepared by the method of the present invention. It can be seen from the pattern that the material is a structure compound with a cerium-zirconium solid solution inside and $YMn_2O_5$ precipitated on the outside, and is of a core-shell structure.

Products obtained in other embodiments all have similar composite structures.

Comparative Example 1

For $Ce_{0.4}Zr_{0.5}La_{0.05}Pr_{0.05}O_{1.95}$, the same method for testing the oxygen storage capacity as in Embodiment 1 was used to calculate a total oxygen storage capacity to be 498 umol $O_2$/g by counting the peak area of consumed O2.

Comparative Example 2

$LaMnO_3$ 18 mL of $La(NO_3)_3$ solution with a concentration of 3 mol/L and 18 mL of $Mn(NO_3)_2$ solution with a concentration of 5 mol/L were respectively poured into a 200 mL beaker, and well mixed after being stirred magnetically for 10 min. 100 mL of 1.5 mol/L NaOH solution was taken, added dropwise to the above yttrium-manganese solution, and kept stirred magnetically for 1 h. After the addition of the NaOH solution was completed, stirring was continued for 10 min, then 2 mL of 30% $H_2O_2$ was added, and the stirring was continued for 30 min. The above precipitate was filtered, washed and cleaned with deionized water, dried in an oven at 210° C. for 24 h, then calcined in a muffle furnace at 820° C. for 3 h, and taken out and ground to obtain a product with D50=8.5 μm.

For a composite compound prepared above, the same method for testing the oxygen storage capacity as in Embodiment 1 was used to calculate a total oxygen storage capacity to be 693 umol $O_2$/g by counting the consumed O2 peak area.

Embodiment 31

50 mg of the composite compound prepared in each embodiment was taken respectively and put in a microreactor to conduct a catalyst activity evaluation test. The contents of NO, $NO_2$ and $NO_x$ at corresponding temperatures were recorded by an infrared gas analyzer (MKS), thereby calculating a conversion rate of NO. The specific test conditions were as follows: the volume composition of the reaction gas was as follows: 10% of oxygen, 100 ppm nitric oxide, and nitrogen as a balance gas at a total flow rate of 150 mL/min. Reaction temperature was set as follows: the temperature was raised from room temperature to 400° C. at a rate of 20° C./min, and reaction duration was 20 min. The test results are shown in Table 1.

TABLE 1

Table of catalytic performance parameters in respective embodiments

| No. | Component | Maximum NO conversion rate (%) | Temperature corresponding to maximum NO conversion rate (° C.) |
|---|---|---|---|
| Embodiment 1 | $0.10CeMn_2O_5$—$0.90Ce_{0.4}Zr_{0.6}O_{1.94}$ | 67 | 296 |
| Embodiment 2 | $0.15YMn_2O_5$—$0.85Ce_{0.3}Zr_{0.6}La_{0.1}O_{1.89}$ | 72 | 289 |
| Embodiment 3 | $0.2LaMn_2O_5$—$0.8Ce_{0.4}Zr_{0.5}La_{0.05}Pr_{0.05}O_{1.92}$ | 76 | 284 |
| Embodiment 4 | $0.25SmMn_2O_5$—$0.75Ce_{0.2}Zr_{0.7}La_{0.03}Nd_{0.07}O_{1.9}$ | 82 | 274 |
| Embodiment 5 | $0.3La_{0.33}Sm_{0.67}Mn_2O_5$—$0.7Ce_{0.6}Zr_{0.3}La_{0.05}Y_{0.05}O_{1.94}$ | 85 | 267 |
| Embodiment 6 | $0.3La_{0.2}Ce_{0.2}Y_{0.6}Mn_2O_5$—$0.7Ce_{0.4}Zr_{0.5}La_{0.02}Nd_{0.05}Y_{0.03}O_{1.95}$ | 87 | 262 |
| Embodiment 7 | $0.10Ce_{0.25}MnO_2$—$0.90Ce_{0.4}Zr_{0.5}Y_{0.1}O_{1.94}$ | 61 | 327 |
| Embodiment 8 | $0.15Y_4Mn_8O_{18}$—$0.85Ce_{0.3}Zr_{0.6}La_{0.1}O_{1.89}$ | 65 | 321 |
| Embodiment 9 | $0.2LaSmMn_3O_6$—$0.8Ce_{0.4}Zr_{0.5}La_{0.05}Pr_{0.05}O_{1.92}$ | 68 | 315 |
| Embodiment 10 | $0.25EuMn_4O_7$—$0.75Ce_{0.2}Zr_{0.7}La_{0.03}Nd_{0.07}O_{1.9}$ | 71 | 303 |
| Embodiment 11 | $0.3Pr_3Ma_5O_{12}$—$0.7Ce_{0.6}Zr_{0.3}La_{0.05}Y_{0.05}O_{1.94}$ | 73 | 294 |
| Embodiment 12 | $0.3LaYCeMn_6O_{14}$—$0.7Ce_{0.6}Zr_{0.3}La_{0.05}Y_{0.05}O_{1.94}$ | 77 | 297 |
| Embodiment 13 | $0.2CeY_2Mn_7O_{15}$—$0.8Ce_{0.4}Zr_{0.5}La_{0.05}Pr_{0.05}O_{1.92}$ | 80 | 282 |
| Embodiment 14 | $0.2LaCeNdMn_8O_{16}$—$0.8Ce_{0.4}Zr_{0.5}La_{0.02}Y_{0.08}O_{1.97}$ | 85 | 274 |
| Embodiment 15 | $0.10CeMn_2O_5$—$0.90Ce_{0.4}Zr_{0.6}O_{1.95}$ | 73 | 310 |
| Embodiment 16 | $0.15YMn_2O_5$—$0.85Ce_{0.3}Zr_{0.6}La_{0.1}O_{1.92}$ | 76 | 288 |
| Embodiment 17 | $0.2LaMn_2O_5$—$0.8Ce_{0.4}Zr_{0.5}La_{0.05}Pr_{0.05}O_{1.93}$ | 80 | 281 |
| Embodiment 18 | $0.25SmMn_2O_5$—$0.75Ce_{0.2}Zr_{0.7}La_{0.03}Nd_{0.07}O_{1.94}$ | 82 | 277 |
| Embodiment 19 | $0.3La_{0.33}Sm_{0.67}Mn_2O_5$—$0.7Ce_{0.6}Zr_{0.3}La_{0.05}Y_{0.05}O_{1.96}$ | 83 | 269 |
| Embodiment 20 | $0.3La_{0.2}Ce_{0.2}Y_{0.6}Mb_2O_5$—$0.7Ce_{0.4}Zr_{0.5}La_{0.02}Nd_{0.05}Y_{0.03}O_{1.97}$ | 85 | 267 |
| Embodiment 21 | $0.3Y_{0.5}MnO_{2.5}$—$0.7Ce_{0.4}Zr_{0.5}La_{0.05}Y_{0.05}O_{1.92}$ | 82 | 288 |
| Embodiment 22 | $0.25Ce_{0.5}YMn_3O_{7.5}$—$0.75Ce_{0.2}Zr_{0.7}La_{0.05}Nd_{0.05}O_{1.94}$ | 83 | 271 |

TABLE 1-continued

Table of catalytic performance parameters in respective embodiments

| No. | Component | Maximum NO conversion rate (%) | Temperature corresponding to maximum NO conversion rate (° C.) |
|---|---|---|---|
| Embodiment 23 | $0.2La_{1.25}Mn_{2.5}O_{7.25}$—$0.8Ce_{0.4}Zr_{0.5}La_{0.05}Pr_{0.05}O_{1.93}$ | 81 | 275 |
| Embodiment 24 | $0.15Ce_{0.4}Sm_{0.4}Mn_{1.6}O_4$—$0.85Ce_{0.3}Zr_{0.6}La_{0.1}O_{1.92}$ | 78 | 279 |
| Embodiment 25 | $0.10Ce_{0.5}Y_{0.5}Mn_2O_5$—$0.90Ce_{0.4}Zr_{0.6}O_{1.96}$ | 75 | 285 |
| Embodiment 26 | $0.3La_{0.1}Ce_{0.1}Y_{0.8}Mb_2O_5$—$Ce_{0.4}Zr_{0.5}La_{0.05}Y_{0.05}O_{1.89}$ | 85 | 261 |
| Embodiment 27 | $0.25Ce_{0.5}SmMn_3O_{7.5}$—$0.75Ce_{0.2}Zr_{0.7}La_{0.03}Nd_{0.07}O_{1.9}$ | 86 | 266 |
| Embodiment 28 | $0.3Pr_3Ma_5O_{12}$—$0.7Ce_{0.6}Zr_{0.3}La_{0.05}Y_{0.05}O_{1.98}$ | 84 | 272 |
| Embodiment 29 | $0.3YMn_2O_5$—$0.7Ce0_{0.4}Zr_{0.5}La_{0.05}Pr_5O_{1.95}$ | 86 | 265 |
| Embodiment 30 | $0.3YMn_{1.8}Fe_{0.2}O_5$—$0.7Ce_{0.4}Zr_{0.5}La_{0.05}Pr_{0.05}O_{1.95}$ | 88 | 248 |
| Comparative Example 1 | $Ce_{0.4}Zr_{0.5}La_{0.05}Pr_{0.05}O_{1.95}$ | 10 | 386 |
| Comparative Example 2 | $LaMnO_3$ | 55 | 354 |

It can be seen from Table 1 that when the composite compounds according to the embodiments of the present invention catalyze the oxidation of NO, the maximum conversion rate of NO can reach 88%, which is 78% higher than that of Comparative Example 1, and 30% higher than that of Comparative Example 2.

Described above are merely several embodiments of the present invention, and are not intended to limit the present invention in any form. Although the present invention is disclosed as above with preferred embodiments, which are not intended to limit the present invention. With departing from the scope of the technical solution of the present invention, some variations or modifications made by any person skilled in the art by using the technical content disclosed above are all equivalent to those made in the equivalent embodiments, and shall fall within the scope of the technical solution.

What is claimed is:

1. A rare-earth-manganese/cerium-zirconium-based composite compound,
   comprising a core-shell structure, having a general formula expressed as: A $RE_cB_aO_b$-(1-A)$Ce_xZr_{(1-x-y)}M_yO_{2-z}$, wherein $0.1 \leq A \leq 0.3$;
   a shell layer has a main component of rare-earth manganese oxide having a general formula of $RE_cB_aO_b$, wherein RE is a rare-earth element or a combination of more than one rare-earth elements, B is Mn or a combination of Mn and a transition metal element, $1 \leq a \leq 8$, $2 < b \leq 18$, and $0.25 \leq c \leq 4$; and
   a core has a main component of cerium-zirconium composite oxide having a general formula of $Ce_xZr_{(1-x-y)}M_yO_{2-z}$, wherein M is at least one selected from a group consisting of a non-cerium rare-earth element and a transition metal element, $0.1 \leq x \leq 0.9$, $0 \leq y \leq 0.3$, and $0.01 \leq z \leq 0.3$.

2. The rare-earth-manganese/cerium-zirconium-based composite compound according to claim 1, wherein a mass of the Mn element in the shell layer is 70-98 wt % of a total mass of the Mn element in the rare-earth-manganese/cerium-zirconium-based composite compound.

3. The rare-earth-manganese/cerium-zirconium-based composite compound according to claim 1, wherein cerium in the cerium-zirconium composite oxide has composite valence states of trivalence and tetravalence, and tetravalent cerium accounts for 60-90 wt % of the total amount of cerium.

4. The rare-earth-manganese/cerium-zirconium-based composite compound according to claim 1, wherein $1 \leq a \leq 3$, $2 \leq b \leq 8$, and the shell layer is a compound of a mullite-type structure.

5. The rare-earth-manganese/cerium-zirconium-based composite compound according to claim 4, wherein a mass of the Mn element in the shell layer is 70-95 wt % of a total mass of the Mn element in the rare-earth-manganese/cerium-zirconium-based composite compound.

6. The rare-earth-manganese/cerium-zirconium-based composite compound according to claim 1, wherein
   the rare-earth element RE in the rare-earth manganese oxide comprises one or more selected from a group consisting of lanthanum, cerium, praseodymium, neodymium, samarium, europium, gadolinium, and yttrium;
   M in the cerium-zirconium composite oxide is one or more selected from a group consisting of lanthanum, praseodymium, neodymium, yttrium, samarium, europium, gadolinium, holmium, erbium, thulium, ytterbium, hafnium, aluminum, and barium.

7. The rare-earth-manganese/cerium-zirconium-based composite compound according to claim 1, wherein the shell layer further contains one or more selected from a group consisting of a hydroxide, a carbonate and a basic carbonate, with a content of 0.01-1 wt %.

8. The rare-earth-manganese/cerium-zirconium-based composite compound according to claim 1, wherein
   the rare-earth manganese oxide is doped with the transition metal element which is one or more selected from a group consisting of iron, tungsten, molybdenum, nickel, cobalt, vanadium, and titanium; and
   a mass of the transition metal element is 0.01%-10% of a mass of the rare-earth manganese oxide, wherein the mass of the transition metal element is based on the self-mass of the transition metal element, and the mass of the rare-earth manganese oxide is based on the mass of the rare-earth manganese oxide before the transition metal element is doped.

9. The rare-earth-manganese/cerium-zirconium-based composite compound according to claim 1, wherein an oxygen storage capacity of the rare-earth-manganese/cerium-zirconium-based composite compound is not less than 800 umol-$O_2$/g.

10. The rare-earth-manganese/cerium-zirconium-based composite compound according to claim 1, wherein a particle size D50 is 1-15 μm.

11. A method for preparing the rare-earth-manganese/cerium-zirconium-based composite compound according to claim 1, comprising:
reacting a mixed raw material containing a divalent manganese source, a rare-earth source, and a cerium-zirconium composite oxide to obtain the rare-earth-manganese/cerium-zirconium-based composite compound.

12. The method for preparing the rare-earth-manganese/cerium-zirconium-based composite compound according to claim 11, wherein said reacting the mixed raw material containing the divalent manganese source, the rare-earth source and the cerium-zirconium composite oxide comprises the following steps:
preparing the divalent manganese source, the rare-earth source and the cerium-zirconium composite oxide according to a stoichiometric ratio of a final product; and
adding a mixed solution containing the divalent manganese source and the rare-earth source to the cerium-zirconium composite oxide for reaction, and after the reaction is completed, drying, calcining and pulverizing a resultant to obtain the rare-earth-manganese/cerium-zirconium-based composite compound.

13. The method for preparing the rare-earth-manganese/cerium-zirconium-based composite compound according to claim 12, wherein the reaction occurs under the following specific conditions:
the reaction occurs under stirring;
a reaction temperature is 15-45° C.; and
reaction duration is 5-20 min.

14. The method for preparing the rare-earth-manganese/cerium-zirconium-based composite compound according to claim 12, wherein the divalent manganese source in the mixed solution has a concentration of 2-4 mol/L, with a molar weight of the divalent manganese source based on a molar weight of a manganese element; and
the rare-earth source in the mixed solution has a concentration of 0.5-2 mol/L, with a molar weight of the rare-earth source based on a molar weight of the rare-earth element.

15. The method for preparing the rare-earth-manganese/cerium-zirconium-based composite compound according to claim 12, wherein the mixed solution containing the divalent manganese source and the rare-earth source has a volume accounting for 70-150% of a pore volume of the cerium zirconium composite oxide.

16. The method for preparing the rare-earth-manganese/cerium-zirconium-based composite compound according to claim 11, wherein said reacting the mixed raw material containing the manganese source, the rare-earth source and the cerium-zirconium composite oxide comprises the following steps:
preparing the divalent manganese source, the rare-earth source and the cerium-zirconium composite oxide according to a stoichiometric ratio of a final product; and
adding a precipitant and an oxidant sequentially to a mixed slurry containing the divalent manganese source, the rare-earth source and the cerium-zirconium composite oxide for reaction, and after the reaction is completed, washing, drying, calcining and pulverizing a resultant to obtain the rare-earth-manganese/cerium-zirconium-based composite compound.

17. The method for preparing the rare-earth-manganese/cerium-zirconium-based composite compound according to claim 16, wherein the precipitant is at least one selected from a group consisting of sodium hydroxide, ammonia water, ammonium bicarbonate and potassium hydroxide.

18. The method for preparing the rare-earth-manganese/cerium-zirconium-based composite compound according to claim 16, wherein the precipitant has an amount of substance accounting for 5-90% of a stoichiometric amount required to precipitate a manganese element and a rare-earth element in the slurry.

19. The method for preparing the rare-earth-manganese/cerium-zirconium-based composite compound according to claim 16, wherein the precipitant is added to the mixed slurry in a form of a precipitant solution; and
the precipitant in the precipitant solution has a concentration of 0.5-5 mol/L.

20. The method for preparing the rare-earth-manganese/cerium-zirconium-based composite compound according to claim 16, wherein the oxidant is at least one selected from a group consisting of hydrogen peroxide, oxygen, sodium persulfate, potassium persulfate and ammonium persulfate.

21. The method for preparing the rare-earth-manganese/cerium-zirconium-based composite compound according to claim 16, wherein the oxidant has an amount of substance being 0.05-1 time an amount of substance of $Mn^{2+}$ contained in the slurry.

22. The method for preparing the rare-earth-manganese/cerium-zirconium-based composite compound according to claim 16, wherein the washing occurs under the following specific conditions:
the washing is performed by using deionized water, with a washing end-point at which a conductivity of the deionized water is less than 40 us/cm.

23. The method for preparing the rare-earth-manganese/cerium-zirconium-based composite compound according to claim 16, wherein the mixed slurry containing the divalent manganese source, the rare-earth source and the cerium-zirconium composite oxide is prepared by a method comprising the following steps:
adding the cerium-zirconium composite oxide to water to obtain a cerium-zirconium composite oxide slurry; and
mixing the mixed solution containing the divalent manganese source and the rare-earth source with the cerium-zirconium composite oxide slurry to obtain the mixed slurry.

24. The method for preparing the rare-earth-manganese/cerium-zirconium-based composite compound according to claim 23, wherein the cerium-zirconium composite oxide in the cerium-zirconium composite oxide slurry has a mass concentration of 10-50%.

25. The method for preparing the rare-earth-manganese/cerium-zirconium-based composite compound according to claim 23, wherein the divalent manganese source in the mixed solution has a concentration of 0.5-2.5 mol/L, with a molar weight of the divalent manganese source based on a molar weight of the manganese element; and
the rare-earth source in the mixed solution has a concentration of 0.5-1.5 mol/L, with a molar weight of the rare-earth source based on a molar weight of the rare-earth element.

26. The method for preparing the rare-earth-manganese/cerium-zirconium-based composite compound according to claim 11, wherein the divalent manganese source is a soluble metal salt of the manganese, and the soluble metal salt of the manganese is at least one selected from a group consisting of a manganese nitrate, a manganese acetate, a manganese chloride and a manganese sulfate; and the rare-earth source is a soluble metal salt of the rare earth, and the soluble metal salt of the rare earth is at least one selected from a group consisting of a rare-earth nitrate, a rare-earth acetate, a rare-earth chloride and a rare-earth sulfate.

27. The method for preparing the rare-earth-manganese/cerium-zirconium-based composite compound according to claim 16, wherein the calcining occurs under the following conditions:

a calcining temperature is 500-900° C.; and calcining duration is 1-6 h.

28. A catalyst comprising the rare-earth-manganese/cerium-zirconium-based composite compound according to claim 1, wherein the catalyst is used for catalytic oxidation of NO in motor vehicle exhaust.

* * * * *